(12) United States Patent
Ruybal et al.

(10) Patent No.: US 11,406,947 B2
(45) Date of Patent: Aug. 9, 2022

(54) EQUILIBRATOR FOR RAPID AND CONTINUOUS DETECTION OF A GAS IN A LIQUID

(71) Applicant: U.S. Environmental Protection Agency, Denver, CO (US)

(72) Inventors: Christopher Ruybal, La Jara, CO (US); Dominic DiGiulio, Ada, OK (US)

(73) Assignee: U.S. Environmental Protection Agency, Washington, DC (US)

( * ) Notice: Subject to any disclaimer, the term of this patent is extended or adjusted under 35 U.S.C. 154(b) by 214 days.

(21) Appl. No.: 15/379,905

(22) Filed: Dec. 15, 2016

(65) Prior Publication Data
US 2020/0094201 A1 Mar. 26, 2020

Related U.S. Application Data

(60) Provisional application No. 62/268,353, filed on Dec. 16, 2015.

(51) Int. Cl.
*B01F 25/312* (2022.01)
*C02F 1/44* (2006.01)
(Continued)

(52) U.S. Cl.
CPC ............ *B01F 25/312* (2022.01); *B01F 23/23* (2022.01); *C02F 1/44* (2013.01); *B01F 23/23762* (2022.01)

(58) Field of Classification Search
None
See application file for complete search history.

(56) References Cited

U.S. PATENT DOCUMENTS 2,336,430 A * 12/1943 Wery ................. B01D 19/0042
96/204
4,123,800 A * 10/1978 Mazzei ................. B01F 5/0653
366/163.2
(Continued)

OTHER PUBLICATIONS

Abril et al. (2006). In situ measurements of dissolved gases (CO2 and CH4) in a wide range of concentrations in a tropical reservoir using an equilibrator. Science of The Total Environment, 354 No. 2-3: 246-251.
(Continued)

*Primary Examiner* — Christopher P Jones
*Assistant Examiner* — Phillip Y Shao
(74) *Attorney, Agent, or Firm* — Caesar Rivise, PC

(57) ABSTRACT

A rapid and continuous separator or equilibrator to separate a gas from a liquid includes a venturi and injector, a mixer and a free overfall stream to separate a gas from a liquid. The injector introduces a carrier medium into the liquid which provides a reservoir for the gas to diffuse into as the liquid and carrier make a single transit through the apparatus. The separator was developed to enable real-time estimation of methane concentrations in ground water during purging. Real-time monitoring allows evaluation of trends during water well purging, spatial trends between water wells, and temporal comparisons between sampling events. These trends may be a result of removal of stored casing water, pre-purge ambient borehole flow, formation physical and chemical heterogeneity, or vertical flow outside of well casing due to poor bentonite or cement seals. Real-time information in the field can help focus an investigation, aid in determining when to collect a sample, save money by limiting costs (e.g. analytical, sample transport and storage), and provide an immediate assessment of local methane concentrations, Four domestic water wells, one municipal water well, and one agricultural water well were sampled for (Continued)

traditional laboratory analysis and compared to the field separator or equilibrator results. Applying a paired t-test comparing the new separator or equilibrator method and traditional laboratory analysis yielded a p-value 0.383, suggesting no significant difference between the two methods for the current study. Additional field and laboratory-based experimentation and potential modification of this device are necessary to justify use beyond screening at this time. However, early separator or equilibrator use suggests promising results and applications.

22 Claims, 17 Drawing Sheets

(51) Int. Cl.
    *B01F 23/23*       (2022.01)
    *B01F 23/237*     (2022.01)

(56) References Cited

U.S. PATENT DOCUMENTS

| | | | | |
|---|---|---|---|---|
| 4,695,378 | A | 9/1987 | Ackman et al. | |
| 5,494,576 | A | 2/1996 | Hoppe et al. | |
| 5,674,312 | A * | 10/1997 | Mazzei | B01D 19/0005 210/512.1 |
| 5,842,600 | A | 12/1998 | Singleterry et al. | |
| 6,193,893 | B1 * | 2/2001 | Mazzei | B01D 17/0205 210/702 |
| 6,537,458 | B1 * | 3/2003 | Polderman | B01D 17/00 210/801 |
| 6,730,214 | B2 * | 5/2004 | Mazzei | B01D 19/0068 210/188 |
| 6,840,983 | B2 * | 1/2005 | McNulty | B01D 19/0005 95/263 |
| 6,981,997 | B2 * | 1/2006 | Williams | B01D 19/0005 426/475 |
| 7,357,565 | B2 * | 4/2008 | Gopalan | B01F 3/04503 239/533.2 |
| 7,374,602 | B2 * | 5/2008 | McNulty | B01D 19/0005 95/245 |
| 7,476,320 | B1 * | 1/2009 | Koons | B09C 1/002 210/610 |
| 7,531,096 | B2 * | 5/2009 | Yarbrough | C02F 9/00 210/748.15 |
| 9,909,957 | B1 * | 3/2018 | Wiederin | G01N 1/28 |
| 2013/0180404 | A1 * | 7/2013 | Fogelman | B01D 19/0057 95/266 |
| 2014/0217031 | A1 * | 8/2014 | Wang | B01D 15/40 210/656 |

OTHER PUBLICATIONS

Adamson et al. (2012). Field Investigation of Vapor-Phase-Based Groundwater Monitoring. Ground Water Monitoring & Remediation, 32 No. 1: 59-72.
Adamson et al. (2009). Laboratory validation study of new vapor-phase-based approach for groundwater monitoring. Remediation Journal, 20 No 1: 87-106.
Agrawal. (2013). Performance of Venturi Scrubber. International Journal of Engineering Research and Development, 7 No. 11. 53-69.
Arunagiri et al. (2011). Interfacial area and mass transfer coefficients in liquid-gas ejectors. Theoretical Foundations of Chemical Engineering, 45 No. 6: 818-823.
Bagatur. (2005). Technical note: Minimal conditions for venturi aeration of water flows. Proceedings of the ICE-Water Management, 158 No. 3: 127-130.
Bange et al. (1996). The Aegean Sea as a source of atmospheric nitrous oxide and methane. Marine Chemistry, 53 No. 1-2: 41-49.
Baylar et al. (2003). Air entrainment and oxygen transfer in a venturi. Proceedings of the ICE-Water and Maritime Engineering, 156 No. 3: 249-255.
Baylar et al. (2006). The Development of Aeration Performance with Different Typed Nozzles in a Vertical Plunging Water Jet System. International Journal of Science and Technology, 1 No. 1:51-63.
Baylar et al. (2006). Applications of Venturi Principle to Water Aeration Systems. Environmental Fluid Mechanics, 6 No. 4: 341-357.
Baylar et al. (2007). On the Use of Venturi Tubes in Aeration. CLEAN—Soil, Air, Water, 35 No. 2: 183-185.
Baylar et al. (2010). Effect of air inlet hole diameter of venturi tube on air injection rate. KSCE Journal of Civil Engineering, 14 No. 4: 489-492.
Charpentier. (1977). A review of the data on mass transfer parameters in most gas-liquid reactors. In Two-phase flows and heat transfer; proceedings of NATO Advanced Study Institute, Aug. 16-27, Istanbul, Turkey, 869-910. Washington, DC: Hemisphere Pub. Corp.
Chisti et al. (1990). Mass transfer in external-loop airlift bioreactors using static mixers. The Canadian Journal of Chemical Engineering, 68 No. 1: 45-50.
Cohen et al. (1988). Simulation of sampling and hydraulic tests to assess a hybrid monitoring well design. Groundwater Monitoring & Remediation, 8 No. 1: 51-59.
Coleman et al. (1988). Microbial methane in the shallow Paleozoic sediments and glacial deposits of Illinois, U.S.A. Chemical Geology, 71 No. 1-3: 23-40.
Copin-Montegut. (1985). A method for the continuous determination of the partial pressure of carbon dioxide in the upper ocean. Marine Chemistry, 17 No. 1: 13-21.
Corcho Alvarado et al. (2007). Constraining the age distribution of highly mixed groundwater using 39Ar: A multiple environmental tracer (3H/3He, 85Kr, 39Ar, and 14C) study in the semiconfined Fontainebleau Sands Aquifer (France). Water Resources Research, 43 No. 3.
Cosier. (1997). Ground Water Sampling and Time Series Evaluation Techniques to Determine Vertical Concentration Distributions. Groundwater, 35 No. 5: 825-841.
Cramers et al. (2001). Influence of the ejector configuration, scale and the gas density on the mass transfer characteristics of gas-liquid ejectors. Chemical Engineering Journal, 82 No. 1-3: 131-141.
Crisman et al. (2001). Application procedures for the electromagnetic borehole flowmeter in shallow unconfined aquifers. Groundwater Monitoring & Remediation, 21 No. 4: 96-100.
Digiulio et al. (2011). Investigation of ground water contamination near Pavillion, Wyoming [draft]: Office of Research and Development, National Risk Management Research Laboratory.
Dong et al. (2012). Aeration efficiency influenced by venturi aerator arrangement, liquid flow rate and depth of diffusing pipes. Environmental Technology, 33 No. 11: 1289-1298.
Elci et al. (2001). Implications of Observed and Simulated Ambient Flow in Monitoring Wells. Ground Water, 39 No. 6: 853-862.
Evans et al. (2001). Performance of confined plunging liquid jet bubble column as a gas-liquid reactor. Chemical Engineering Science, 56 No. 3: 1151-1157.
Fan et al. (1975). Mass-transfer coefficient and pressure-drop data of two-phase oxygen-water flow in bubble column packed with static mixers. Journal of Chemical and Engineering Data, 20 No. 1: 26-28.
Feely et al. (1998). A new automated underway system for making high precision pCO2 measurements onboard research ships. Analytica Chimica Acta, 377 No. 2-3: 185-191.
Frankignoulle et al. (2001). A new design of equilibrator to monitor carbon dioxide in highly dynamic and turbid environments. Water Research, 35 No. 5: 1344 1347.
Gavrilescu et al. (1997). Hydrodynamics in external-loop airlift bioreactors with static mixers. Bioprocess Engineering, 16 No. 2: 93-99.
Gorody. (2012). Factors affecting the variability of stray gas concentration and composition in groundwater. Environmental Geosciences, 19 No. 1: 17-31.

(56) References Cited

OTHER PUBLICATIONS

Goto et al. (1992). The effect of static mixer on mass transfer in draft tube bubble column and in external loop column. Chemical Engineering Science, 47 No. 13-14: 3533-3539.
Harder et al. (1965). Methane in the Fresh-water Aquifers of Southwestern Louisiana and Theoretical Explosion Hazards, ed. L. G. S. Department of Conservation, and Louisiana Department of Public Works. Baton Rouge, LA.
Heyouni et al. (2002). Hydrodynamics and mass transfer in gas-liquid flow through static mixers. Chemical Engineering Science, 57 No. 16: 3325-3333.
Hirsche et al. (2007). A Comprehensive Literature Review on the Applicability of Free and Dissolved Gas Sampling for Baseline Water Well Testing: Final Report: Alberta Environment, Water Policy Branch.
Humenick et al. (1980). Methodology for Monitoring Ground Water at Uranium Solution Mines. Ground Water, 18 No. 3: 262-273.
Hussain et al. (2012). Enhancement in Mass Transfer Using Static Mixers. Science International, 24 No. 4: 163-167.
Jackson. (1964). Aeration in Bernoulli types of devices. AIChE Journal, 10 No. 6: 836-842.
Jackson et al. (2013). Increased stray gas abundance in a subset of drinking water wells near Marcellus shale gas extraction. Proceedings of the National Academy of Sciences, 110 No. 28: 11250-11255.
Johnson (1999). Evaluation of a seawater equilibrator for shipboard analysis of dissolved oceanic trace gases. Analytica Chimica Acta, 395 No. 1-2: 119-132.
Johnson et al. (2007). The Cretaceous-Lower Tertiary Composite Total Petroleum System, Wind River Basin, Wyoming. US Geological Survey.
Kampbell et al. (1998). Determining dissolved hydrogen, methane, and vinyl chloride concentrations in aqueous solution on a nanomolar scale with the bubble strip method. In Proceedings of the 1998 Conference on Hazardous Waste Research.
Kampbell et al. (1998). Analysis of Dissolved Methane, Ethane, and Ethylene in Ground Water by a Standard Gas Chromatographic Technique. Journal of Chromatographic Science, 36 No. 5: 253-256.
Keith et al. (1983). Sources of spatial-temporal variability in groundwater quality data and methods of control. Ground Water Monitoring & Remediation, 3 No. 2: 21-32.
Kortzinger et al. (1996). At-sea intercomparison of two newly designed underway pCO2 systems—encouraging results. Marine Chemistry, 52 No. 2: 133-145.
Loose et al. (2009). Design and deployment of a portable membrane equilibrator for sampling aqueous dissolved gases. Water Resources Research, 45 No. 4: W00D34.
Mackay et al. (1979). Determination of air-water Henry's law constants for hydrophobic pollutants. Environmental Science & Technology, 13 No. 3: 333-337.
Marquez et al. (1994). A review of recent chemical techniques for the determination of the volumetric mass-transfer coefficient kLa in gas-liquid reactors. Chemical Engineering and Processing: Process Intensification, 33 No. 4: 247-260.
Middleton et al. (1978). Motionless mixers as gas liquid contacting devices. A. 1. Ch. E. In 71st Annual meeting, Miami Beach, paper E, vol. 74.
Nielsen et al. (1994). Henry's law constants and infinite dilution activity coefficients for volatile organic compounds in water by a validated batch air stripping method. Environmental science & technology, 28 No. 12: 2133-2138.
Osborn et al. (2011). Methane contamination of drinking water accompanying gas-well drilling and hydraulic fracturing. Proceedings of the National Academy of Sciences, 108 No. 20: 8172-8176.
Ozkan et al. (2006). Experimental investigations of air and liquid injection by venturi tubes. Water and Environment Journal, 20, No. 3 (2006): 114-122.
Park et al. (2013). Flow and oxygen-transfer characteristics in an aeration system using an annular nozzle ejector. Industrial & Engineering Chemistry Research, 52, No. 4: 1756-1763.
Pierrot et al. (2009). Recommendations for autonomous underway pCO2 measuring systems and data-reduction routines. Deep Sea Research Part II: Topical Studies in Oceanography, 56 No. 8-10: 512-522.
Reilly et al. (1993). Effects of physical and chemical heterogeneity on water-quality samples obtained from wells. Groundwater 31, No. 5: 805-813.
Reilly et al. (1998). Experimental evaluation of factors affecting temporal variability of water samples obtained from long-screened wells. Groundwater, 36, No. 4: 566-576.
Reilly et al. (1989). Bias in groundwater samples caused by wellbore flow. Journal of Hydraulic Engineering, 115, No. 2: 270-276.
Robbins et al. (1991). Mass balance evaluation of monitoring well purging: Part I. Theoretical models and Implications for representative sampling. Journal of Contaminant Hydrology, 8, No. 3-4: 203-224.
Robin et al. (1987). Field evaluation of well purging procedures. Groundwater Monitoring & Remediation, 7, No. 4: 85-93.
Rodriguez et al. (2012). Optimization of oxygen transfer through venturi-based systems applied to the biological sweetening of biogas. Journal of Chemical Technology & Biotechnology, 87, No. 6: 854-860.
Salonen et al. (2002). Removal of radon by aeration: testing of various aeration techniques for small water works. Stuk.
Sander. (1999). Compilation of Henry's law constants for inorganic and organic species of potential importance in environmental chemistry. Henry's law constants.
Schneider et al. (1992). CO2 partial pressure in Northeast Atlantic and adjacent shelf waters: Processes and seasonal variability Journal of Marine Systems, 3, No. 6: 453-463.
Schneider et al. (2007). A new method for continuous measurements of O2 in surface water in combination with pCO2 measurements: Implications for gas phase equilibration. Marine chemistry, 103, No. 1-2: 163-171.
Sepos et al. (1985). New quick-setting cement solves shallow gas migration problems and reduces WOC time. In SPE Eastern Regional Meeting Society of Petroleum Engineers.
Thakur et al. (2003). Static mixers in the process industries—a review. Trans IChemE, 81, No. 7: 787-826.
Thomas. (1982). Volatilization from water. Handbook of chemical property estimation methods, 15-1-15-34.
Torres et al. (2013). Evaluation of a semi-automatic system for long-term seawater carbonate chemistry manipulation. Revista Chilena de Historia Natural, 86: 443-451.
Turunen et al. (1994). Mass transfer in tubular reactors equipped with static mixers. Chemical engineering science 49, No. 24: 5257-5269.
Utomo et al. (2008). Investigation on hydrodynamics and mass transfer characteristics of a gas-liquid ejector using three-dimensional CFD modeling. Journal of Mechanical Science and Technology, 22, No. 9: 1821-1829.
Varljen et al. (2006). Numerical simulations to assess the monitoring zone achieved during low-flow purging and sampling. Groundwater Monitoring & Remediation, 26, No. 1: 44-52.
Whisman et al. (2012). Long-Term Variability in Methane in Domestic Water Wells in Northeast Pennsylvania Groundwater & Environmental Services, Inc. and Chesapeake Energy. Retrieved from https://www.yumpu.com/en/document/read/22129090/charles-whisman on Sep. 21, 2021.

* cited by examiner

EQUILIBRATOR FOR RAPID AND CONTINUOUS DETECTION OF A GAS IN A LIQUID

RELATED APPLICATIONS

This non-provisional application claims priority to U.S. Provisional No. 62/268,353, filed Dec. 16, 2015, which is hereby fully incorporated by reference in its entirety

GOVERNMENT RIGHTS

The United States Government has certain rights in this invention because an employee of the U.S. Environmental Protection Agency is a co-inventor, and the invention was supported by general EPA research funds.

FIELD OF THE INVENTION

Embodiments of the present invention relate to systems and methods for separating and detecting a gas contained within a liquid from the liquid, and more specifically for the rapid and continuous separation of the gas from the liquid for the purposes of detection, and more specifically for the real time detection of hydrocarbon gas in water.

BACKGROUND

Advances in horizontal drilling and hydraulic fracturing have led to recent increases in unconventional oil and gas development in the United States. These increases have been accompanied by public concern and awareness for potential environmental contamination and impacts to health and safety. One area of concern is focused on stray gas migration, primarily methane contamination in drinking water wells near oil and gas production areas. Although methane is not a regulated pollutant for drinking water, it poses an explosion hazard if exsolved concentrations reach 5-15% volume in air.

The presence of methane in ground water has also been linked to shale-gas development and potential ground water contamination. Several recent studies present evidence of increased methane contamination in drinking water wells as a result of proximity to gas-well drilling and hydraulic fracturing (Jackson et al. 2013; Osborn et al. 2011). Some studies indicate that the cause of free phase methane migration is a result of increased annular gas pressure and cracks in casing cement for gas-wells (Gorody 2012; Sepos and Cart 1985). However, the occurrence of methane in ground water is widely documented and is often present to some degree prior to gas development. Evaluation of stray gas migration necessitates a comparison with baseline or background concentrations. However, comparisons are complicated by variability between sampling events that may be in part due to the volume and rate of purging. A number of investigators have documented non-uniform concentration trends (increasing or decreasing trends as opposed to erratic variation) during purging (Reilly and Gibs 1993; Reilly and LeBlanc 1998). Keith et al. (1983) identified a number of potential causative factors for observation of solute concentration trends during purging: physical heterogeneity, chemical heterogeneity, screening of wells over multiple water bearing units. Analytical and numerical modeling indicate that concentration trends during purging could be a function of convergent flow (Cosler 1997), lithologic layers of varying hydraulic conductivity (Robbins and Martin-Hayden 1991), anisotropy (Varljen et al. 2006), the ratio of hydraulic conductivity of the sandpack (in this case open borehole around pre-packed screen) to surrounding formation (Cohen and Rabolda 1988), well design (Varljen et al. 2006), and boundary conditions (Varljen et al. 2006).

Concentration variation during purging could be due to ambient borehole flow prior to purging. Ambient flow in monitoring wells is well documented (Crisman et al. 2001). A monitoring well is an open conduit requiring little head differential to induce substantial cumulative flow over an extended period of time between sampling events (Elci et al. 2001; Corcho Alvarado et al. 2007). Significant solute redistribution can occur at head differentials below the sensitivity of currently available instrumentation (Reilly et al. 1989). Thus, it is important to monitor solute concentration during purging.

Comparisons of calculated aqueous concentrations of methane and vapors from well headspace levels to observed concentrations in ground water indicates that well headspace sampling is not an effective replacement for purging and sampling. In one study in Pennsylvania, mg/L concentrations were detected in domestic wells despite non-detection in headspace (Whisman et al. 2012). In another study, calculated concentrations of vapors in ground water from headspace monitoring were biased low compared to actual measurement during purging due to vertical stratification of solute concentration in casing above the screened interval (Adamson et al. 2009; Adamson et al. 2012). This result is not surprising since little or no mixing of water in well casing occurs above a pump inlet upon stabilization of drawdown (Robin and Gillham 1987; Humenick et al. 1980).

Real time measurement of aqueous methane concentration during purging requires rapid gas—water equilibration. Equilibrators are commonly used in oceanic research to determine dissolved gases ($CO_2$, $N_2O$, $CO$, and $CH_4$) in seawater (Feely et al. 1998; Pierrot et al. 2009; Kortzinger et al. 1996; Torres et al. 2013; Johnson 1999; Frankignoulle et al. 2001; Schneider et al. 2007; Abril et al. 2006; Loose et al. 2009; Schneider et al. 1992; Copin-Montegut 1985; Bange et al. 1996). Equilibrator designs can be categorized by five types, 1) shower type, 2) bubble type, 3) laminar flow type, 4) packed type, and 5) membrane type. The shower type equilibrator uses a showerhead to spray a continuous flow of seawater through a fixed headspace volume that is recirculated until equilibrium is reached. The bubble type equilibrator bubbles air through a continuous flow of water. A fixed volume of air is recirculated until equilibrium is reached. The laminar flow type equilibrator allows water to flow downward in a thin film along the walls of a column. Counter-current air flows across the thin film and is recirculated until equilibrium is reached. Packed type equilibrators utilize small glass cylinders or marbles to increase the surface area for gas-water contact. A continuous flow of water flows counter-current to a fixed volume of recirculated air until equilibrium is reached. Membrane type equilibrators use an applied vacuum to allow diffusion of gases in water across a semipermeable membrane until equilibrium is reached. In all equilibrators, a gas sample is collected and analyzed on appropriate instrumentation. The equilibration times for these equilibrators range from around 10 minutes to several hours.

Other techniques for measuring free or dissolved gases in water rely on collection of a discrete samples. Since gas solubility is dependent on temperature and pressure, water samples brought to the surface may degas as the samples adjust to atmospheric pressure or lower hydrostatic pressures. Free gas methods are designed to collect this gas that comes out of solution as a result of partial pressure changes (Coleman et al. 1988). Dissolved gas methods rely on extracting the gas from the water via headspace equilibrium, gas-striping, or purge and trap techniques (Hirsche and Mayer 2007; Kampbell et al. 1998). Samples are collected by either pumping water to the surface, in-situ passive diffusion samplers, or localized grab samples. Analysis of dissolved or free gas concentrations using these techniques rely on an equilibrated headspace in a bottle that is then extracted and analyzed using laboratory equipment or returned to the laboratory for analysis. These techniques lack rapid analysis of free and dissolved gases due to long equilibration times and only represent discrete samples.

BRIEF SUMMARY OF THE INVENTION

Preferred embodiments of the invention generally include an apparatus to separate at least one constituent from a liquid comprising multiple constituents, where the apparatus includes a venturi tube having a venturi orifice and configured to pass a liquid therethrough and introduce a carrier medium into the liquid. The carrier medium could be a second liquid or it could be a second gas. In either case, the gas in the liquid diffuses into the carrier medium as the liquid and carrier medium transit the apparatus. The liquid and the carrier medium move through the apparatus and each makes only one transit through the apparatus. In the case where the carrier medium is a gas, the gas may take the form of bubbles in the liquid. Continuing with the example of the carrier medium being a gas which forms bubbles in the liquid, a first portion of a first constituent in the liquid diffuses into the bubbles. The preferred embodiment also includes a mixer configured to receive the liquid and the bubbles from the venturi orifice, where the mixer mixes the liquid and the bubbles, and also includes a plenum comprising a first exit and configured to receive the liquid and the bubbles from the mixer, wherein the plenum is further configured to pass the liquid and the bubbles through a free overfall stream within the plenum, whereby the bubbles exit the liquid to form a free gas comprising the first constituent over the liquid, and the free gas is discharged from the plenum through the first exit. Preferred embodiments also include where the first constituent is continuously separated from the liquid, and also where the first constituent within the free gas is discharged from the plenum through the first exit in less than about one minute from passing through the venturi orifice. Other embodiments include where the first constituent within the free gas is discharged from the plenum through the first exit in less than about ten seconds from passing through the venturi orifice, and include the first constituent comprising a hydrocarbon gas. Further embodiments include where the liquid comprises water and the hydrocarbon gas comprises methane, and also include where the venturi tube comprises an injection orifice configured to inject bubbles into the liquid and where the bubbles comprise air. Yet other embodiments include where a second portion of the first constituent diffuses from the liquid into the bubbles in the mixer, and also where the mixer comprises a static mixer configured to break at least a portion of the bubbles into smaller bubbles. Additional embodiments are where a third portion of the first constituent diffuses into the free gas from the liquid in the plenum, and where the free gas comprising the first constituent is directed into a gas analyze, and further where the plenum comprises a second exit to discharge the liquid from the plenum.

Preferred embodiments of the invention may also include an apparatus to separate at least one constituent from a liquid comprising multiple constituents, having a venturi tube connected in series to a mixer and the mixer is connected in series to a plenum, whereby the liquid flows through the venturi tube, through the mixer and into the plenum, wherein a first constituent of the liquid is continuously separated from the liquid as the liquid passes through the venturi tube, the mixer and into the plenum. Other preferred embodiments have the liquid pass through the venturi tube, the mixer and into the plenum in less than about one minute, and still other embodiments have the liquid pass through the venturi tube, the mixer and into the plenum in less than about ten seconds. Additional embodiments have the first constituent continuously separated from the liquid as the liquid passes through the venturi tube, the mixer and the into the plenum, and also have the first constituent discharged from the plenum and into a gas analyzer, and further have the liquid comprise water and the first constituent comprises a hydrocarbon.

Other preferred embodiments of the invention include a method to separate at least one constituent from a liquid comprising multiple constituents, including causing a pressure drop in the liquid, introducing bubbles into the liquid, mixing the liquid and the bubbles, and migrating a portion of the bubbles out of the liquid, wherein the bubbles comprise a first constituent from the liquid's multiple constituents. More preferred embodiments include passing the liquid through a venturi orifice, and injecting the bubbles into the liquid in proximity of the venture orifice, and also breaking the bubbles into smaller bubbles. Additional preferred embodiments include breaking the bubbles into smaller bubbles using astatic mixer, and also migrating a portion of the bubbles out of the liquid by passing the liquid through a free overfall stream, and also have collecting the bubbles as a free gas over the liquid and passing the free gas into a gas analyzer.

Rapid mass transfer of methane from water to air was achieved through the combined use of a venturi ejector (for example a Mazzei 283 polypropylene) and static mixer (for example a Koflo SS 1/4-40-3-6R-2) in a series configuration. Additional gas-water separation occurred via an overfall jet stream into a gas-tight plenum. Concentrations are continuously measured during continuous replacement of air and water volumes in the separator or equilibrator.

Venturi ejectors and static mixers are highly effective mass transfer devices and are separately used in other applications across industry and engineering systems (Charpentier 1977; Márquez et al. 1994; Heyouni et al. 2002; Baylar and Emiroglu 2003; Baylar and Ozkan 2006; Baylar et al. 2007; Ozkan et al. 2006b; Dong et al. 2012; Rodriguez et al. 2012; Baylar et al. 2006; Bagatur 2005; Jackson 1964; Salonen et al. 2002; Fan et al. 1975; Turunen and Haario 1994; Thakur et al. 2003; Paglianti 2008; Chisti et al. 1990; Gavrilescu et al. 1997; Hussain et al. 2013; Goto and Gaspillo 1992). Research on venturi ejectors to optimize gas absorption, gas stripping, oxidation, chlorination, and fermentation has increased in recent years (Agrawal 2013). Static mixers have been used to enhance heat transfer, blend miscible fluids, blend solids, and increase the interfacial area during mixing of immiscible fluids (e.g. gas/liquid) (Thakur et al. 2003). The combined use of venturi ejectors and static mixers for gas-liquid mixing is described in at least 3 U.S. patents. Ackman and Place (1987) combined two venturi ejectors in parallel with a static mixer to aerate acid mine water. Hoppe and Watkins (1996) combined a venturi ejector and a static mixer to mix ozone and water for treatment. Singleterry and Larson (1998) combined three venturi ejectors and static mixers (one each in series) in a parallel configuration to carbonate water As ground water is pumped from a well, the water stream is split four ways. The ground water directed towards the separator or equilibrator first passes through a water flowmeter that regulates the flow rate between 1-2 liters per minute (LPM). Ground water then enters the venturi ejector inlet and is constricted to a small diameter throat where a high velocity stream exists. The increased velocity is accompanied by a pressure drop at the throat (less than atmospheric) that passively draws in air through small diameter tubes, in this example air is first passed through granular activated carbon, and is predicted by Bernoulli's Law. Passive flow eliminates the need for injection of gas or air via a pump into the water stream. Flow through a venturi ejector is highly turbulent and rapidly creates new interfaces for mass transfer. Air is entrained into the water via a large number of small bubbles resulting in turbulent two phase bubble flow (e.g., Reynolds number between 50,000 and 364,000 (Baylar et al. 2010)) and a large interfacial area (e.g., 2000 m$^2$/m$^3$—(Agrawal 2013), or in excess of 2000 m$^2$/m$^3$—(Arunagiri et al. 2011)) to enhance mass transfer. A minimum water velocity must be maintained for the pressure differential across the venturi to remain great enough to passively inject air. Gas-water mass transfer rates in venturi ejectors exceed conventional gas-liquid mixing systems such as stirred tanks, bubble columns, and packed columns (Agrawal 2013; Arunagiri et al. 2011; Márquez et al. 1994). The venturi ejector performance is controlled by inlet and throat diameters, downstream pipe length, and air/water flow rates.

After passing through the venturi ejector, the air-water mixture flows through a static mixer. Static mixers, or motionless mixers, contain internal elements installed in pipes, columns, and reactors that provide increased interfacial areas, a uniformed distribution of concentration and temperature, radial mixing, and lengthened gas-liquid contact times (Fan et al. 1975; Turunen and Haario 1994; Thakur et al. 2003; Paglianti 2008). The effectiveness of redistribution is dependent on the design feature of the elements (e.g., helices) and number of elements used (Thakur et al. 2003). Similar to venturi devices, concurrent water and air flow in static mixers results in generation of small relatively uniform bubbles resulting in bubble flow and enhanced mass transfer between water and air (Fan et al. 1975). Air-water mixtures with bubbles have the potential to coalescence but are broken to smaller bubbles upon contact with a mixer because of shear, therefore enhancing volumetric gas-liquid mass transfer rates and coefficients (Chisti et al. 1990; Turunen and Haario 1994; Gavrilescu et al. 1997; Hussain et al. 2013; Goto and Gaspillo 1992; Thakur et al. 2003). Use of a venturi ejector preceding the static mixer eliminates the need to inject air into the static mixer.

Water exiting the static mixer was discharged into a gas-tight plenum for gas-water separation via a free overfall jet stream. Baylar and Ozkan (2006) observed that a free overfall jet plunging into water downstream further enhanced mass transfer and that mass transfer decreased with increasing downstream pipe length from a venturi device.

Water exits the plenum through the bottom and gas through the top. Before entering the instrumentation for analysis, the gas stream passes through a moisture trap (for example a Bacharach Water Trap 0019-3265 and Perma Pure MD Gas Dryer made of Nafion®) to remove water moisture from the gas stream, preventing any interference and instrumentation damage. Gas pressure is monitored with, for example a Dwyer Magnehelic® differential pressure gage and adjusted through relief valves to prevent the gas-tight chamber from dewatering and to prevent excessive pressure buildup near instrumentation intakes. The gas stream is then directed to an analyzer, such as a LandTec GEM 2000 and Thermo Scientific Toxic Vapor Analyzer (TVA1000B) for real-time data analysis. The GEM2000 Plus uses an infrared cell to measure methane in %-volume and is accurate for gas-phase concentration measurements greater than 1.0%. The GEM2000 Plus also has additional sensors capable of measuring $H_2S$, CO, $CO_2$, and O2. These additional gases were simultaneously screened for along with methane. The TVA-1000B was used to measure lower concentrations of methane on a flame ionization detector (FID) below 10,000 ppmv. The instrument also contained a photoionization detector (PID) allowing simultaneous detection of additional compounds to methane which may be present.

Field gas concentrations measured in this study were below 1,200 ppmv. Because the TVA1000B has better resolution than the GEM 2000 at lower concentrations, the measurements from the TVA-1000B were used as the primary data. A correction (specific to the instrument used in this investigation) was applied to TVA-1000B field readings to account for variations of flow rate that deviate from the flow rate used during calibration. The FID shows a linear response to variations of flow rate (Graph 1).

In general, at equilibrium, the initial mass of methane in the aqueous phase is equal to the mass in the aqueous phase after equilibration plus the mass transferred to the gas phase $$C_W = C_G \left( \frac{Q_G}{Q_W} + \frac{1}{K_H} \right) \quad (1)$$

where:
$C_W$=Aqueous concentration (μg L$^{-1}$)
$C_G$=Gas concentration (μg L$^{-1}$)
$K_H$=Dimensionless Henry's law Constant (μg L$^-$gas$^1$/μg L$^-$water$^1$)
$Q_G$=Gas flow rate (L min$^{-1}$)
$Q_W$=Water flow rate (L min$^{-1}$)

Henry's Law is dependent on temperature, pressure, solution chemistry, surfactants, and ionic strength. At pressures near 1 atmosphere (atm), it is assumed that the gas behaves ideally and in dilute solutions the activity coefficients are equal to one. The dimensionless Henry's law constant can be estimated at a temperature of interest from a reference temperature by:

$$K_H = \left[ RTK_H^{\ominus} \exp\left[ \frac{-\Delta_{soln}H}{R'} \left( \frac{1}{T} - \frac{1}{T^{\ominus}} \right) \right] \right]^{-1} \quad (2)$$

where:
$K_H$=Dimensionless Henry's Law Constant at temperature of interest (μg L$^-$gas$^1$/μg L$^-$water$^1$)
$K_H\theta$=Henry's Law Constant at a reference temperature (mol L$^{-1}$ atm$^{-1}$)
$\Delta_{soln}$ H=Enthalpy of solution for compound of interest (J mol$^{-1}$)
T=Temperature of interest (K)
T$\theta$=Reference temperature (K)
R=Gas constant (0.08206 L atm mol$^{-1}$ K$^{-1}$)
R'=Gas constant (8.314 J mol$^{-1}$ K$^{-1}$)

Sander (1999) provides a comprehensive list of Henry's Law Constants and $\Delta_{soln}$H/R' for compounds of interest. Henry's Law Constants are typically expressed in mol L$^{-1}$ atm$^{-1}$. A high dimensionless Henry's Law Constant and low enthalpy of vaporization indicate methane is highly volatile and relativity easy to strip from water. Gas phase concentration using a portable FID is expressed in parts per million volume (ppmv) at a given ambient atmospheric pressure and temperature. Conversion to mass per volume of gas is expressed as:

$$C_G[\mu g/L] = \left(\frac{MP}{RT}\right) C_G[ppmv] \quad (3)$$

where:
M=Molecular weight of compound (g mol$^{-1}$)
P=Ambient atmospheric pressure (atm)
R=Gas Constant (0.08206 L atm mol$^{-1}$ K$^{-1}$)
T=Temperature of interest (K)

A correction (specific to the instrument used in this investigation) was applied to TVA-1000B field readings to account for variations of flow rate that deviate from the flow rate used during calibration (Graph 1). The correction is expressed as:

$$C_{G(TRUE)} = \frac{C_{G(MEASURED)}}{0.818 \text{Flow}(FID) - 0.212} \quad (4)$$

where:
$C_{G(TRUE)}$=Corrected gas concentration for flow rate (ppmv)
$C_{G(MEASURED)}$=Measured gas concentration from TVA-1000B (ppmv)
Flow(FID)=Flow rate to TVA-1000B (L min$^{-1}$) Inserting equation 4 into equation 3 for the gas concentration, and inserting into equation 1 yields an equation for determining aqueous methane concentrations using the TVA-1000B specific to this study (equation 1 represents the generalized form if other instrumentation is used):

$$C_w[\mu g/L] = \left(\frac{C_{G(MEASURED)}}{0.818 \text{ Flow}(FID) - 0.212}\right)\left(\frac{MP}{RT}\right)\left(\frac{Q_G}{Q_W} + \frac{1}{K_H}\right) \quad (5)$$

Batch air stripping is a widely used method for determining Henry's law constants and relies on a dynamic principle developed by Mackay et al. (1979) and Nielsen et al. (1994). An inert gas is purged through water, releasing a dissolved compound. Relative concentrations of one phase are measured over time and it is assumed that the exiting gas is in equilibrium. The separator or equilibrator however, increases gas-water interface contact times for mass transfer, decreases equilibrium times, and equilibrates a continuous flow of sample water, making it superior to batch air stripping and other equilibrator designs.

BRIEF DESCRIPTION OF THE FIGURES

The invention will be described in conjunction with the following drawings in which like reference numerals designate like elements and wherein.

DETAILED DESCRIPTION OF PREFERRED EMBODIMENTS

Figure 1:
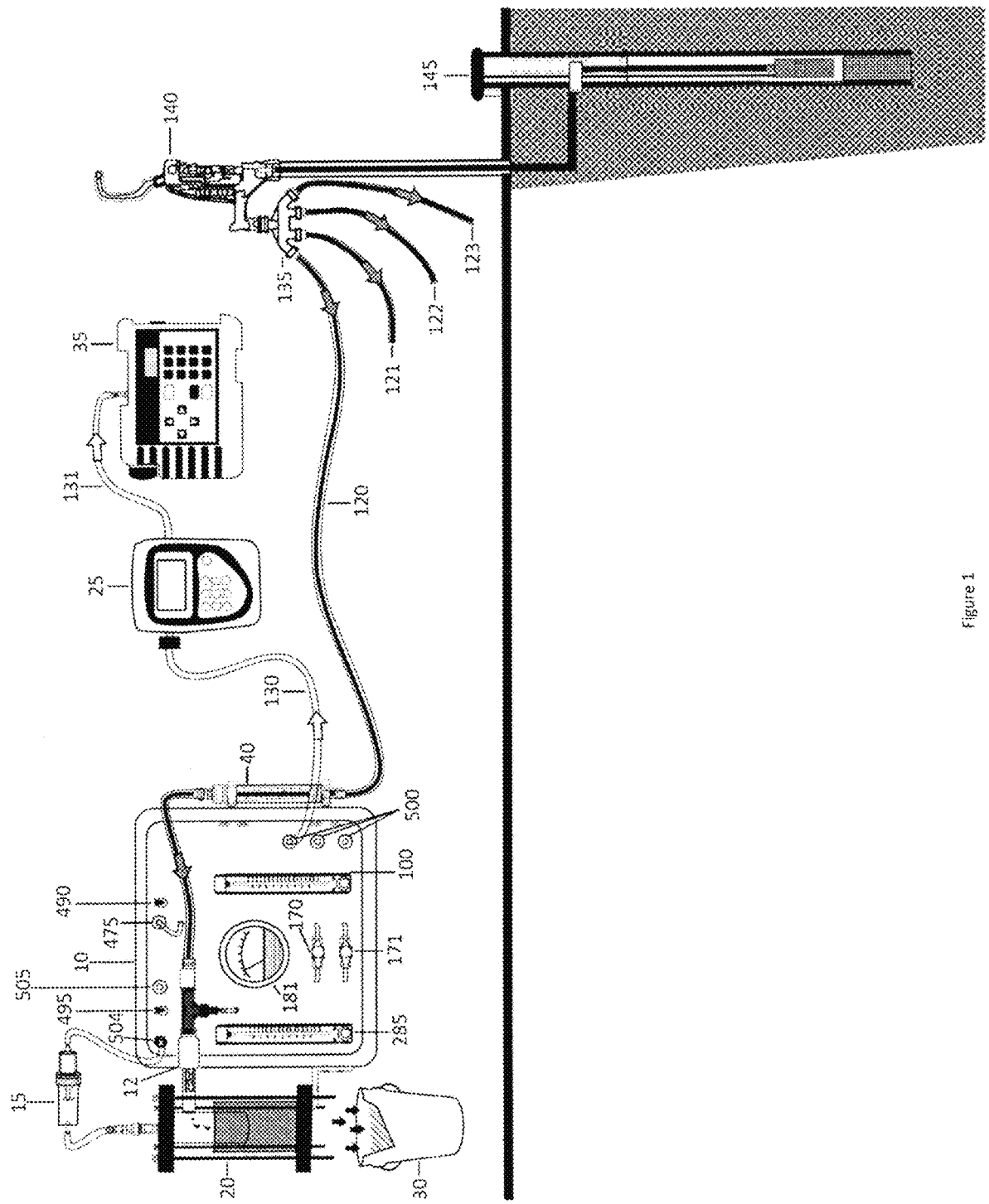
FIG. 1 shows a plan view of an embodiment of an apparatus of the invention.
Figure 2:
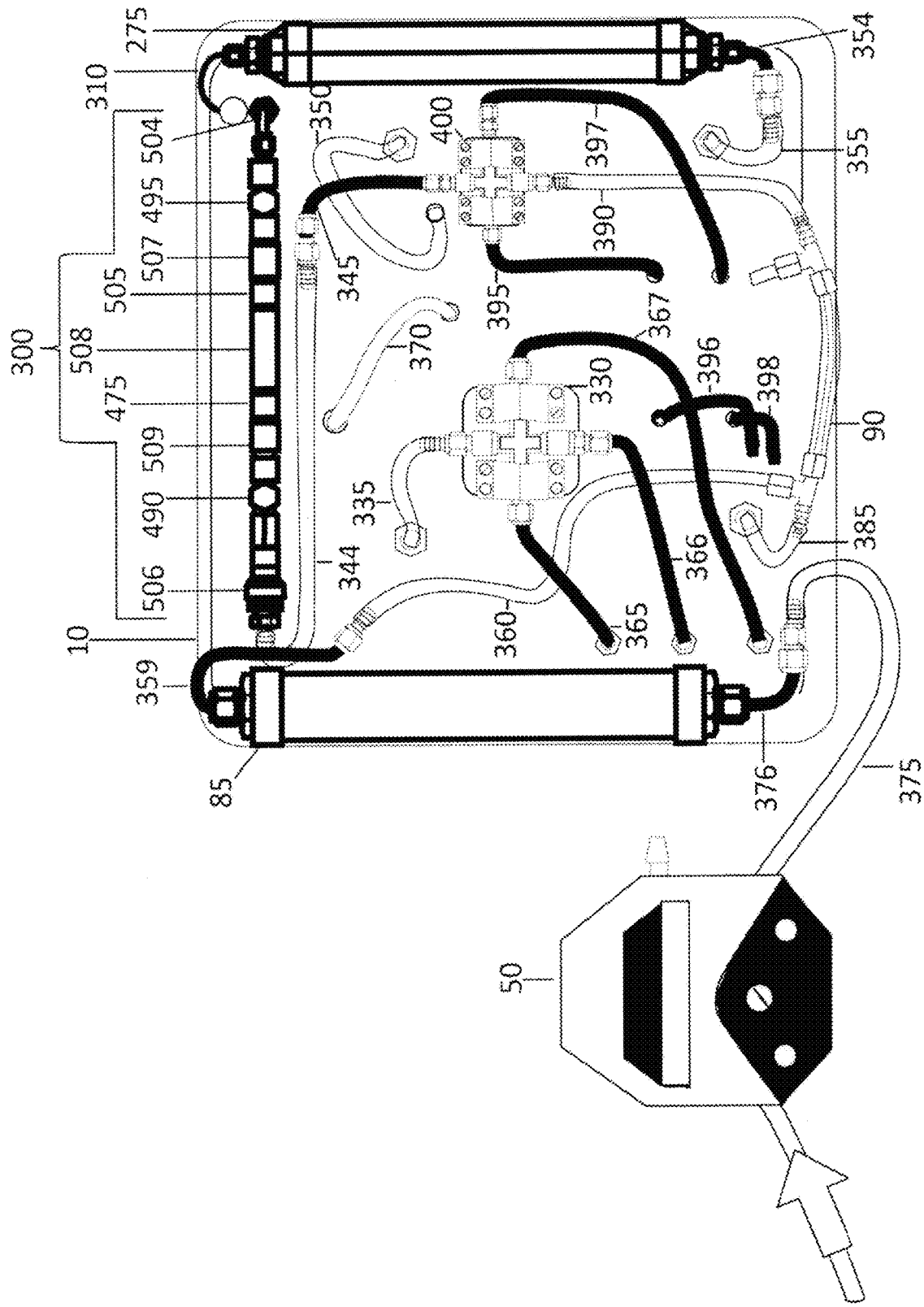
FIG. 2 shows an internal view of an embodiment of a separator of the apparatus.
Figure 3:
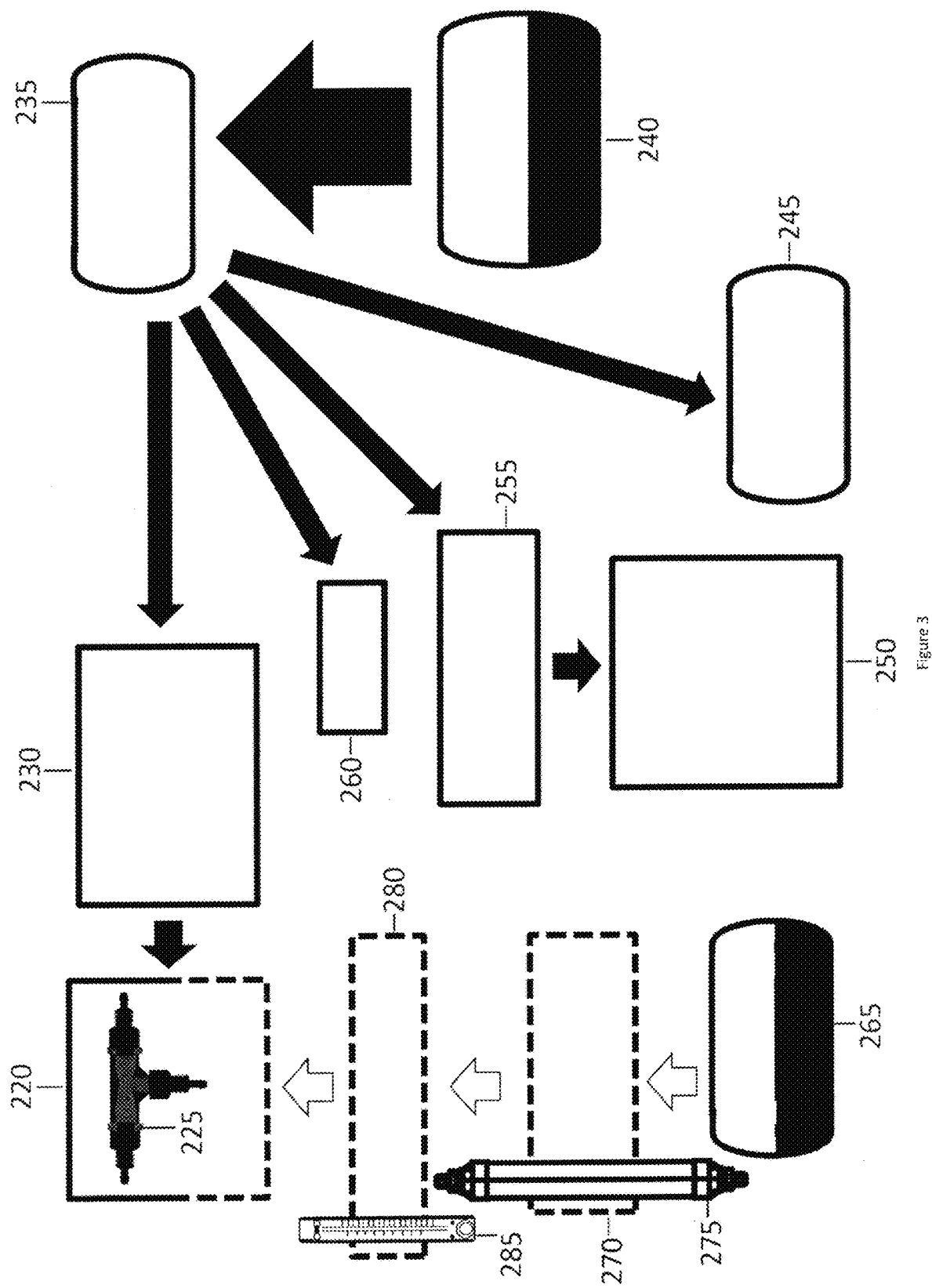
FIGS. 3, 4, 5, 6 and 7 are flow charts of embodiments of the method of the invention.
Figure 4:
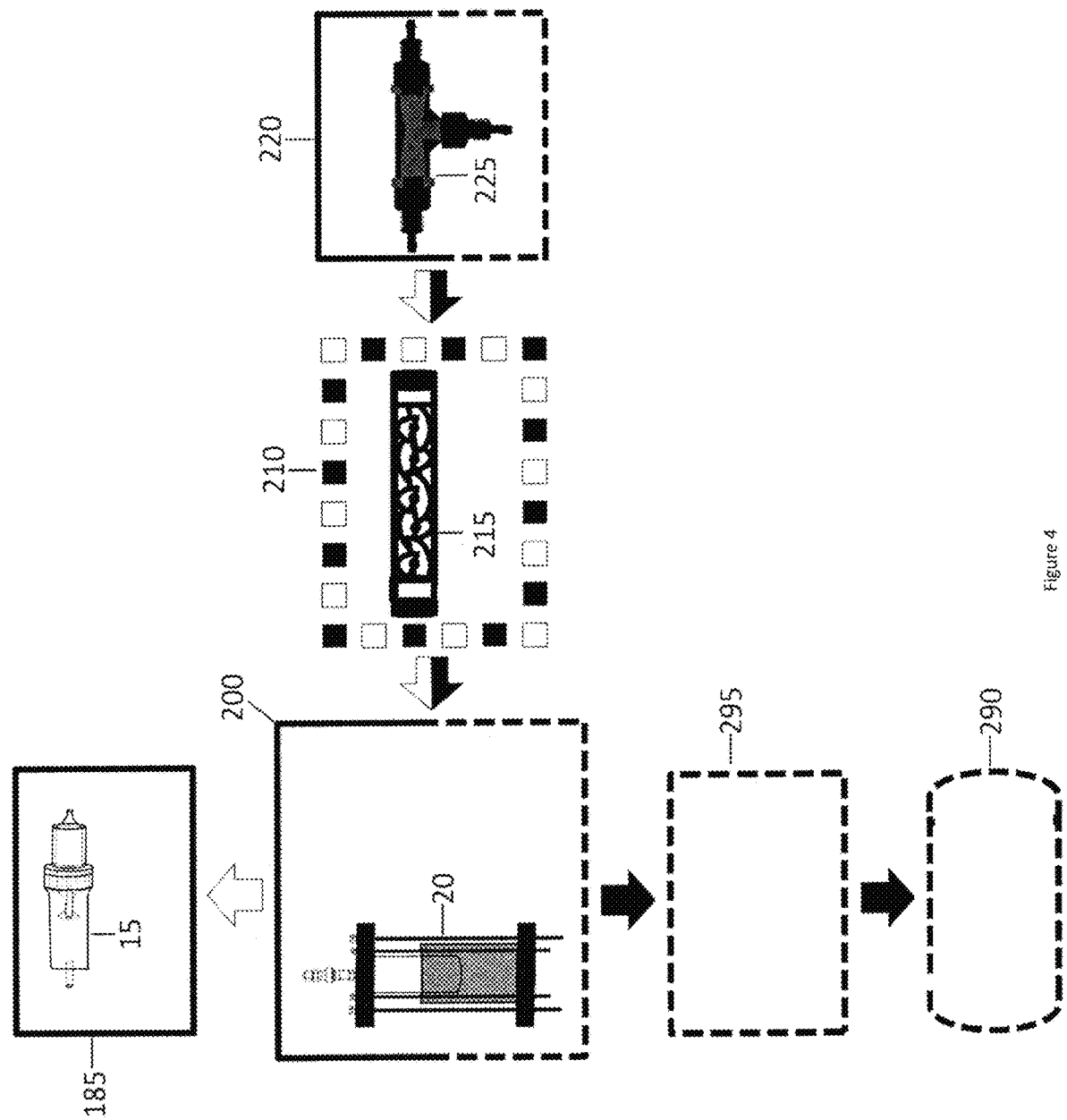
Figure 5:
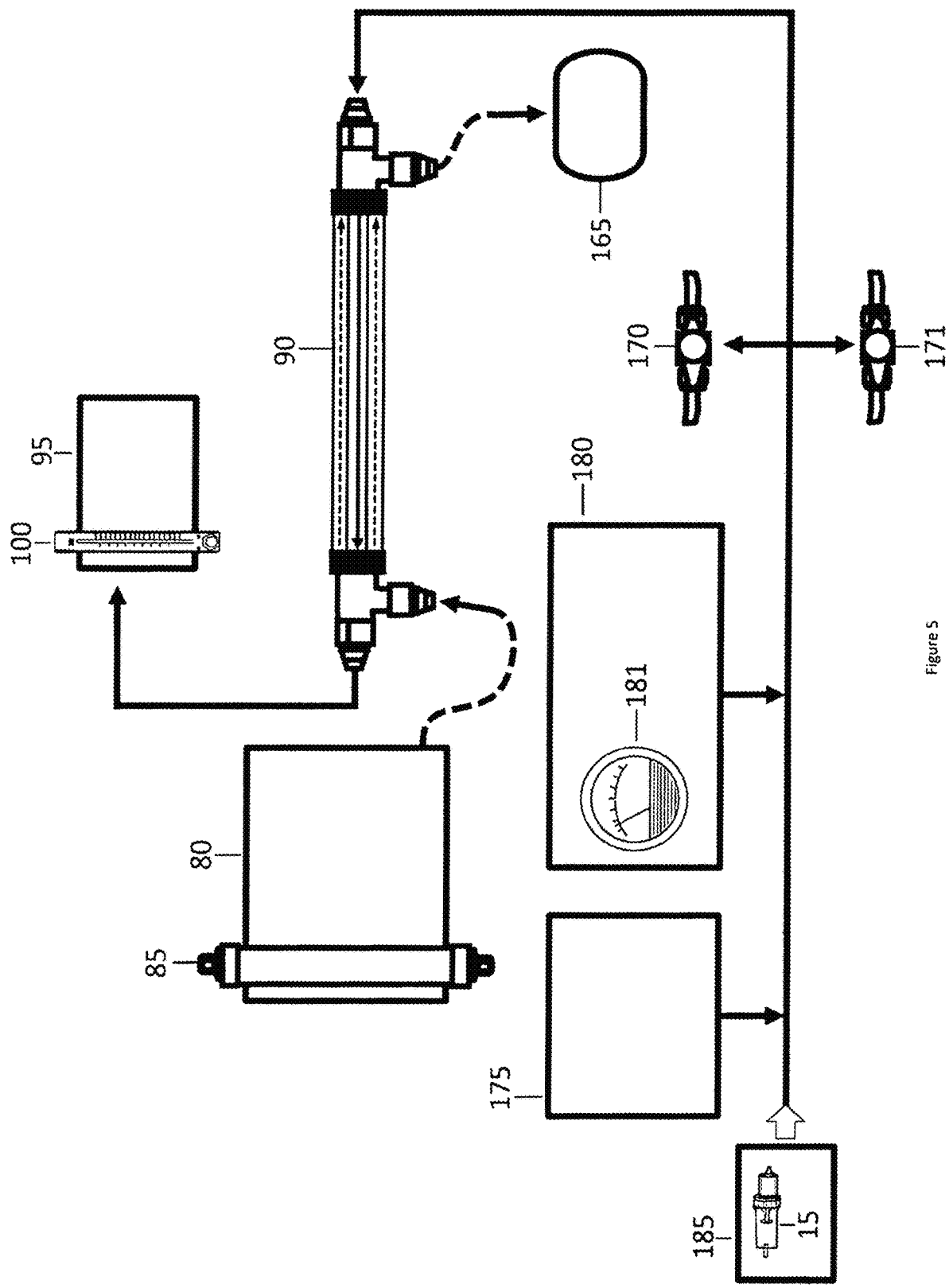
Figure 6:
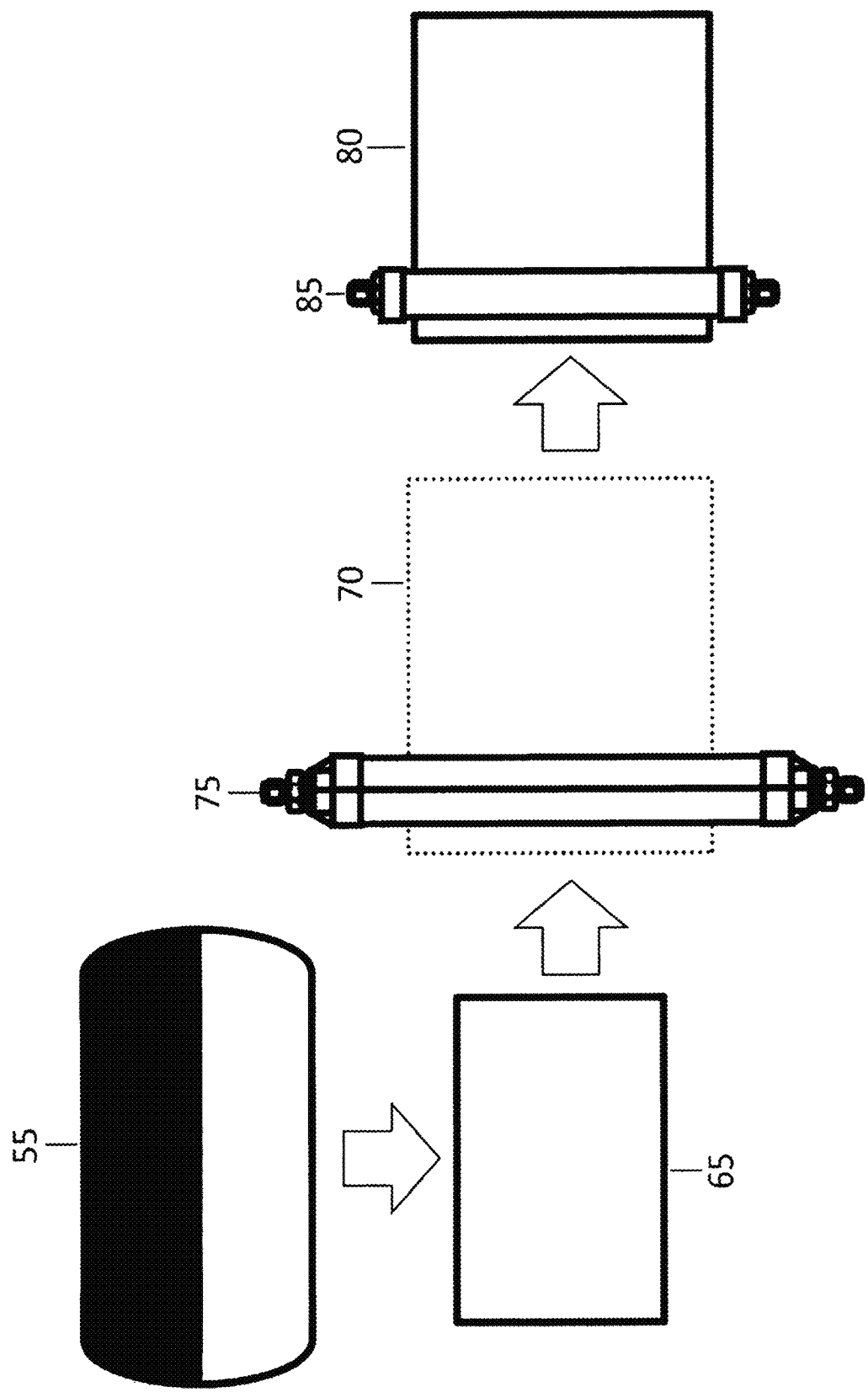
Figure 7:
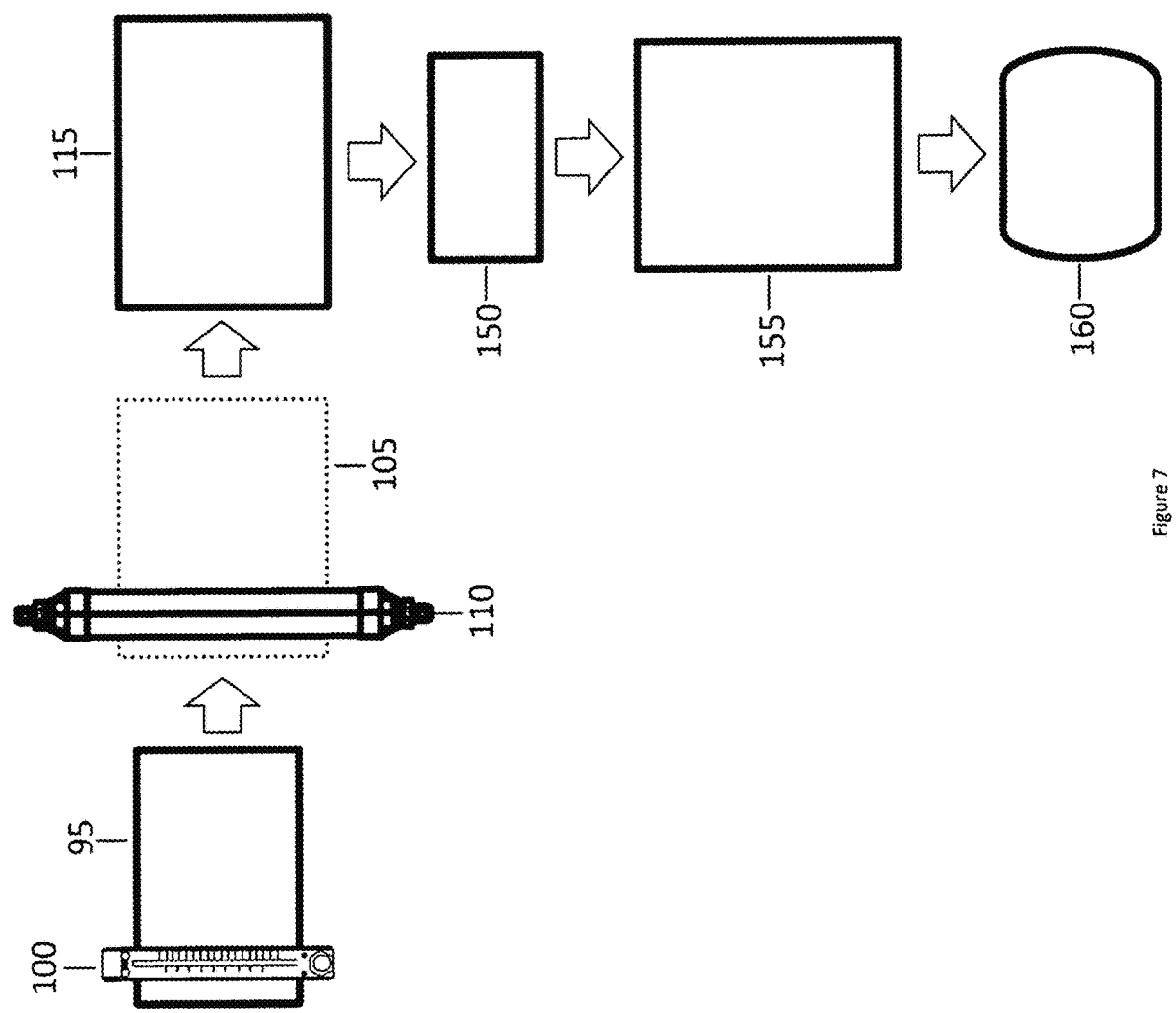
Figure 8:
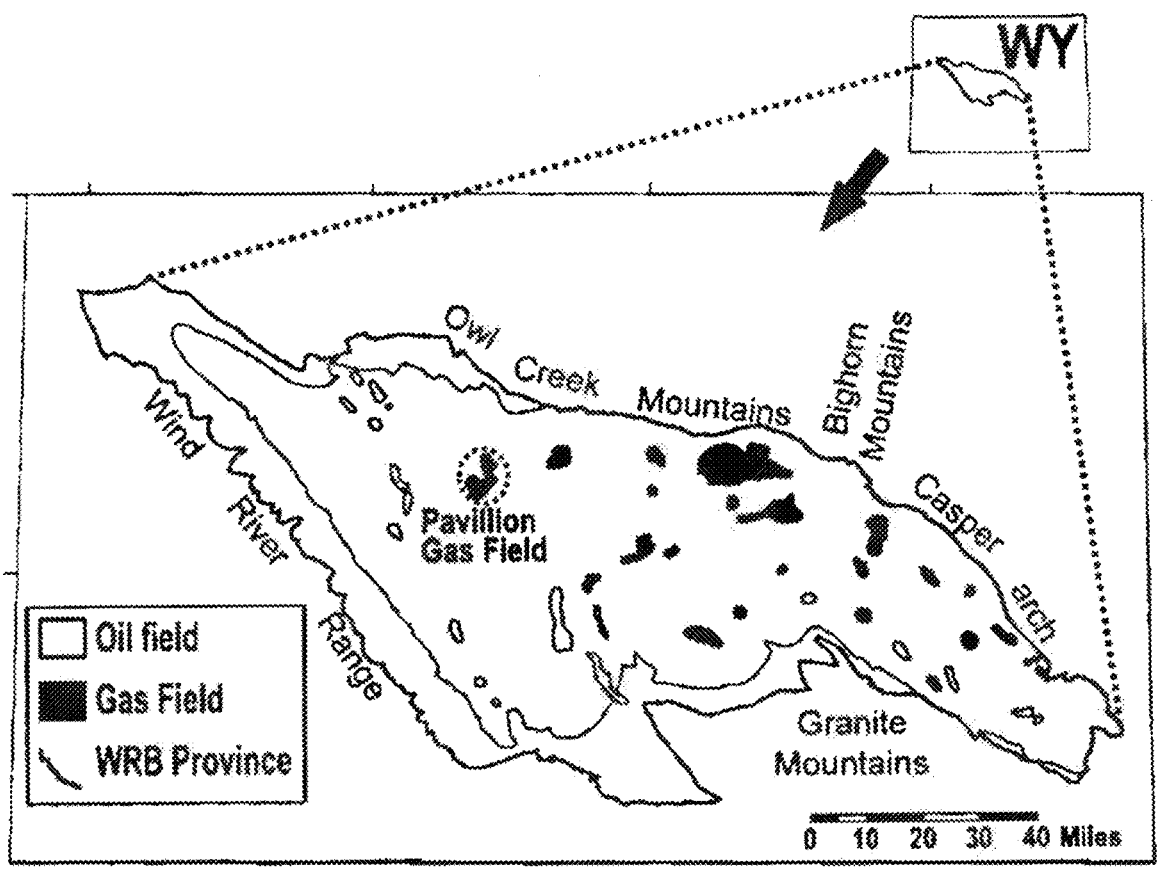
FIG. 8 shows a map of the Wind River Basin located in central Wyoming, wherein the water-wells investigated overlie the Pavillion Gas Field.
Figure 9:
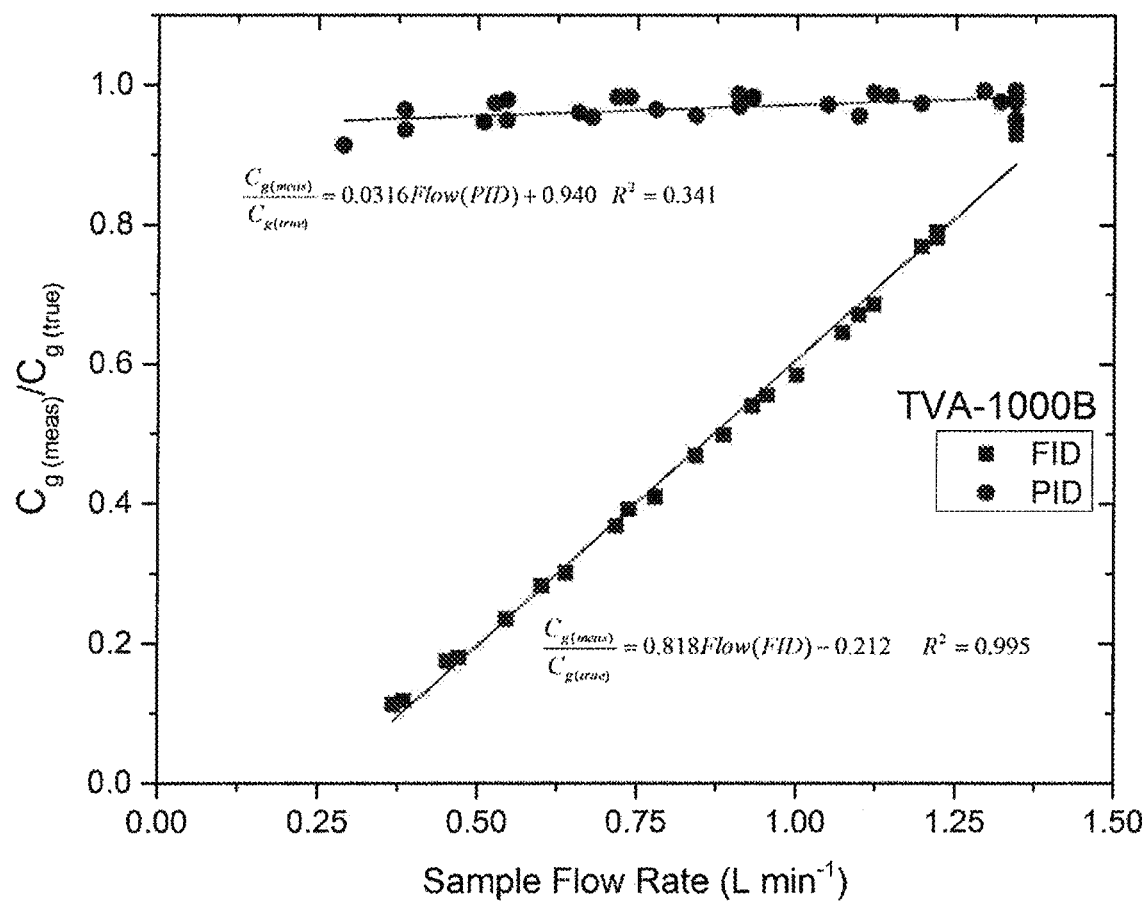
FIG. 9 shows normalized concentration measurements for FID and PID related to sample flow rate entering the TVA-1000B for analysis. Methane gas (1000 ppmv) was used to evaluate the FID response and isobutylene gas (452 ppmv) was used to evaluate the PID response to sample flow rate.
Figure 10:
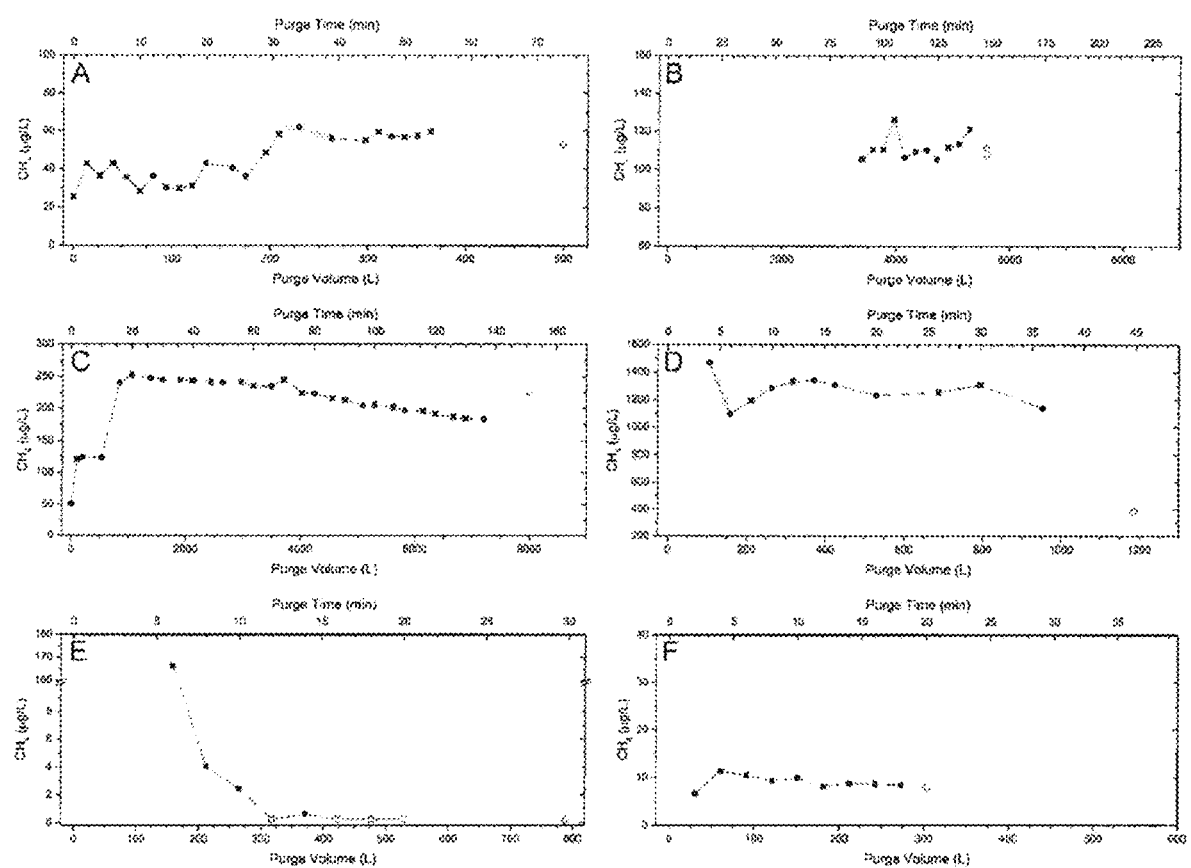
FIG. 10 shows plots for aqueous methane as a function of purge volume and purge time for locations A) PGDW05; B) PGDW20; C) PGDW23; D) PGDW30; E) PGDW50 F) PGPW02. The squares are field measurements on the separator or equilibrator and the open diamond represents the traditional laboratory sample.
Figure 11:
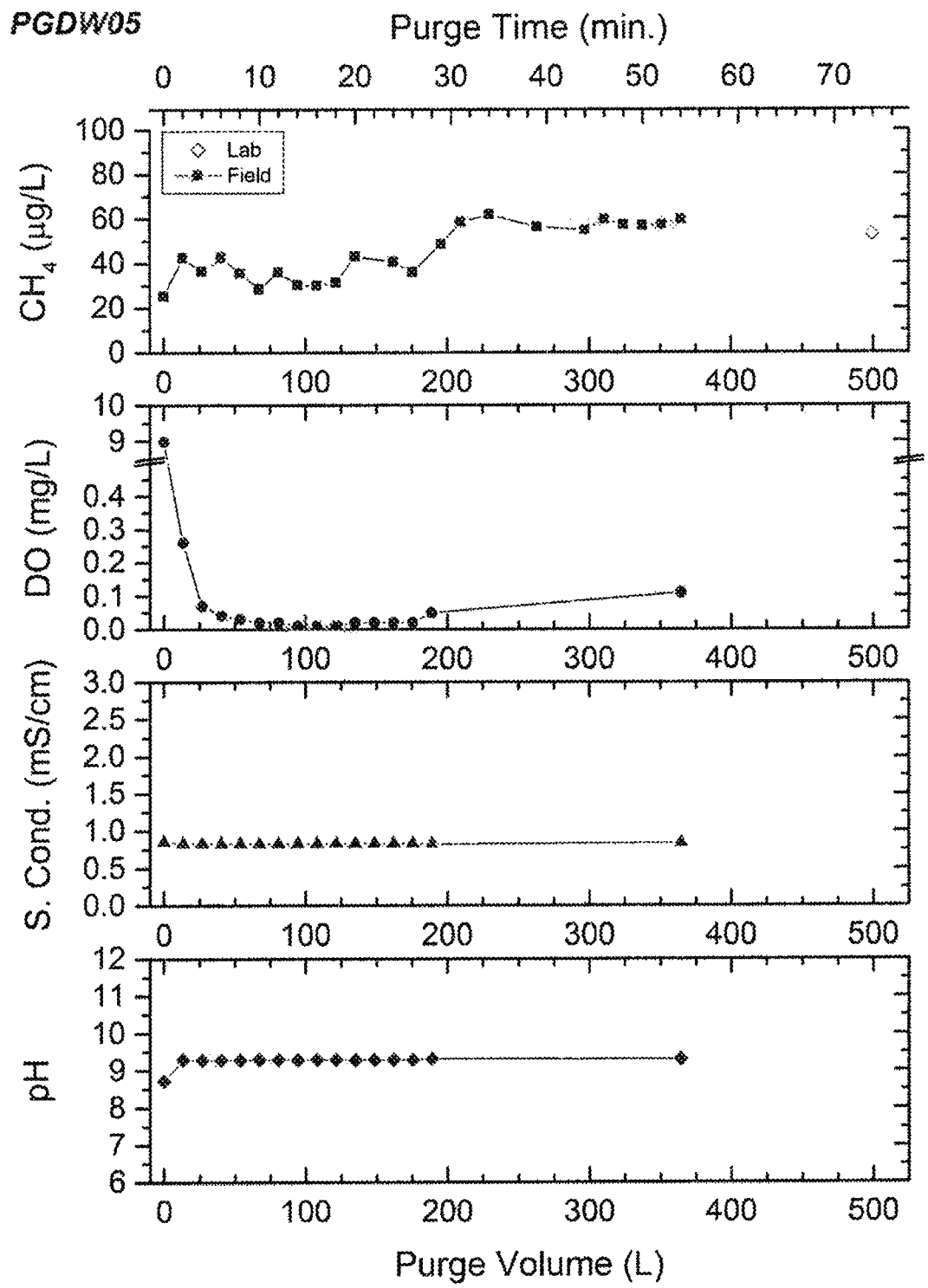
FIG. 11 shows purge results comparing aqueous methane concentrations against dissolved oxygen (DO), specific conductance, and pH for PGDW05 as a function of purge volume and purge time.
Figure 12:
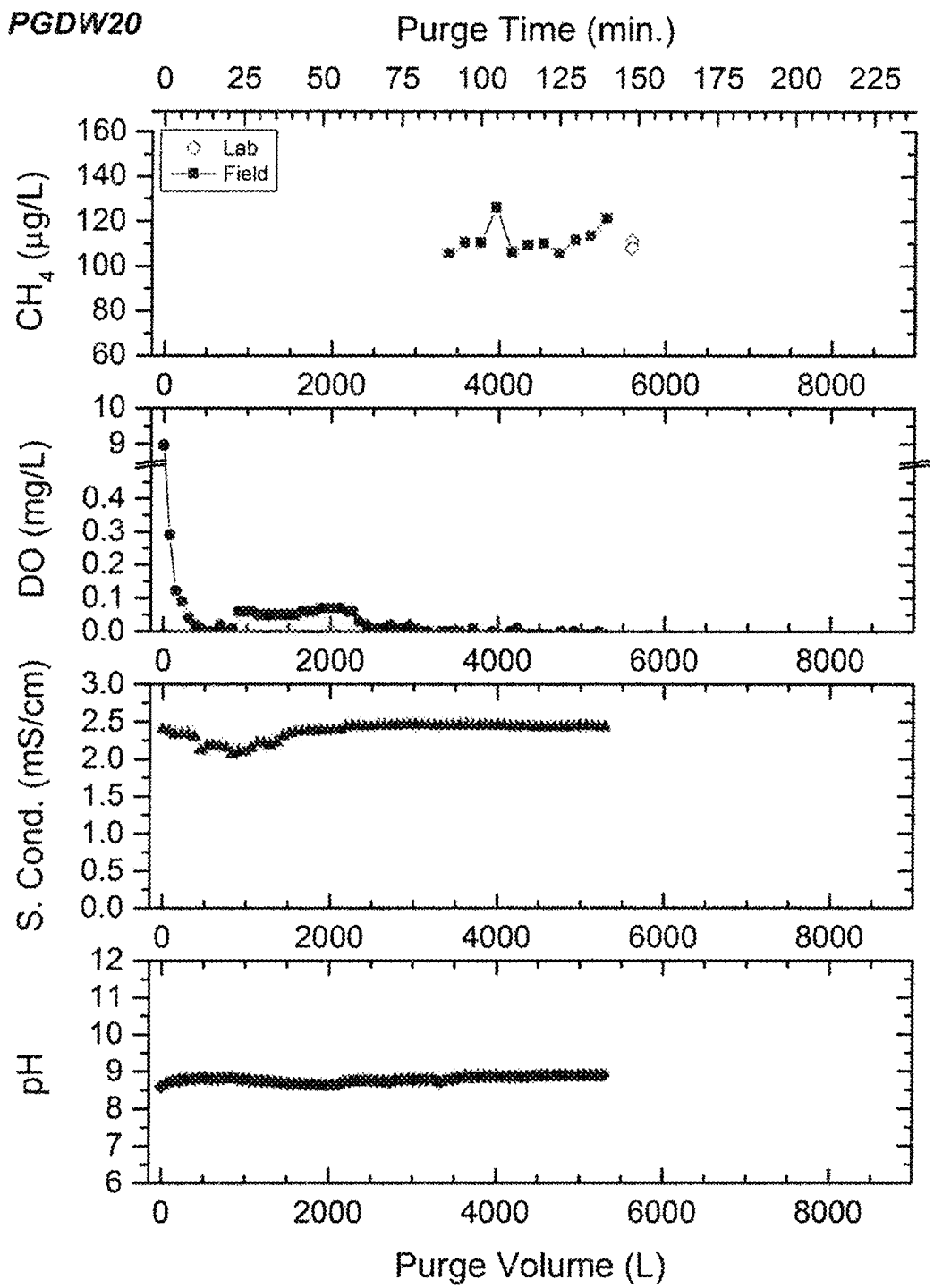
FIG. 12 shows purge results comparing aqueous methane concentrations against dissolved oxygen (DO), specific conductance, and pH for PGDW20 as a function of purge volume and purge time.
Figure 13:
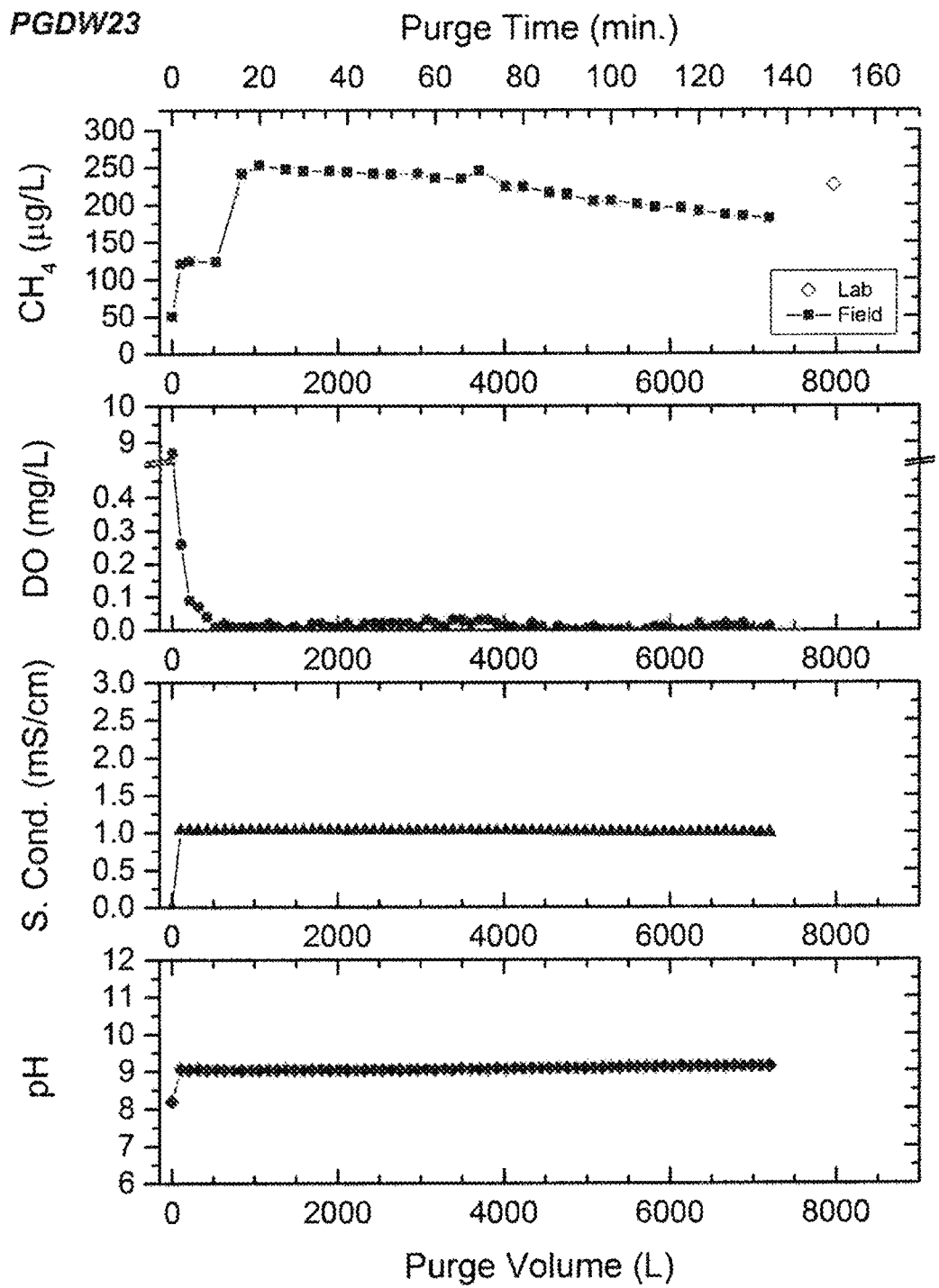
FIG. 13 shows purge results comparing aqueous methane concentrations against dissolved oxygen (DO), specific conductance, and pH for PGDW23 as a function of purge volume and purge time.
Figure 14:
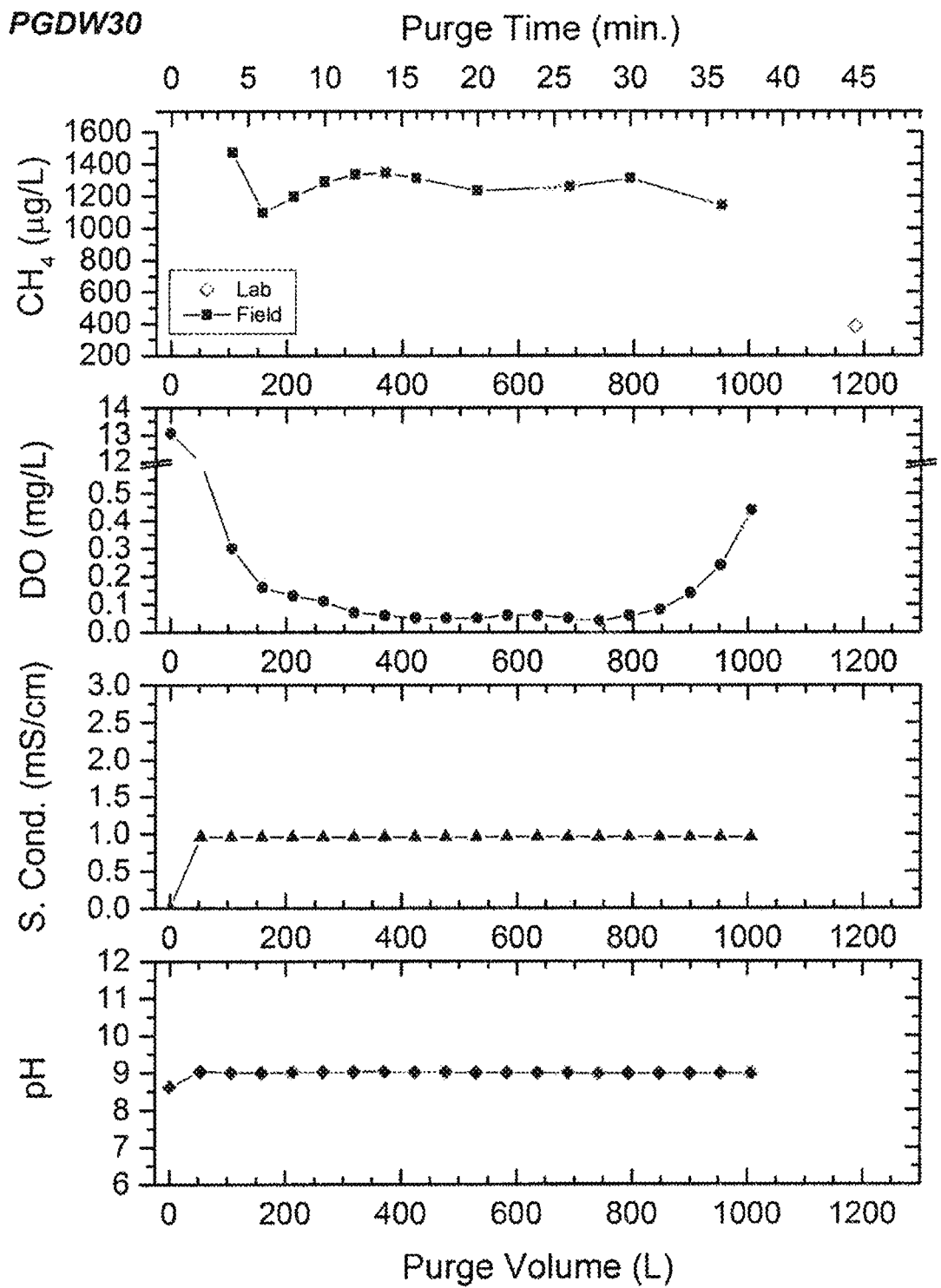
FIG. 14 shows purge results comparing aqueous methane concentrations against dissolved oxygen (DO), specific conductance, and pH for PGDW30 as a function of purge volume and purge time.
Figure 15:
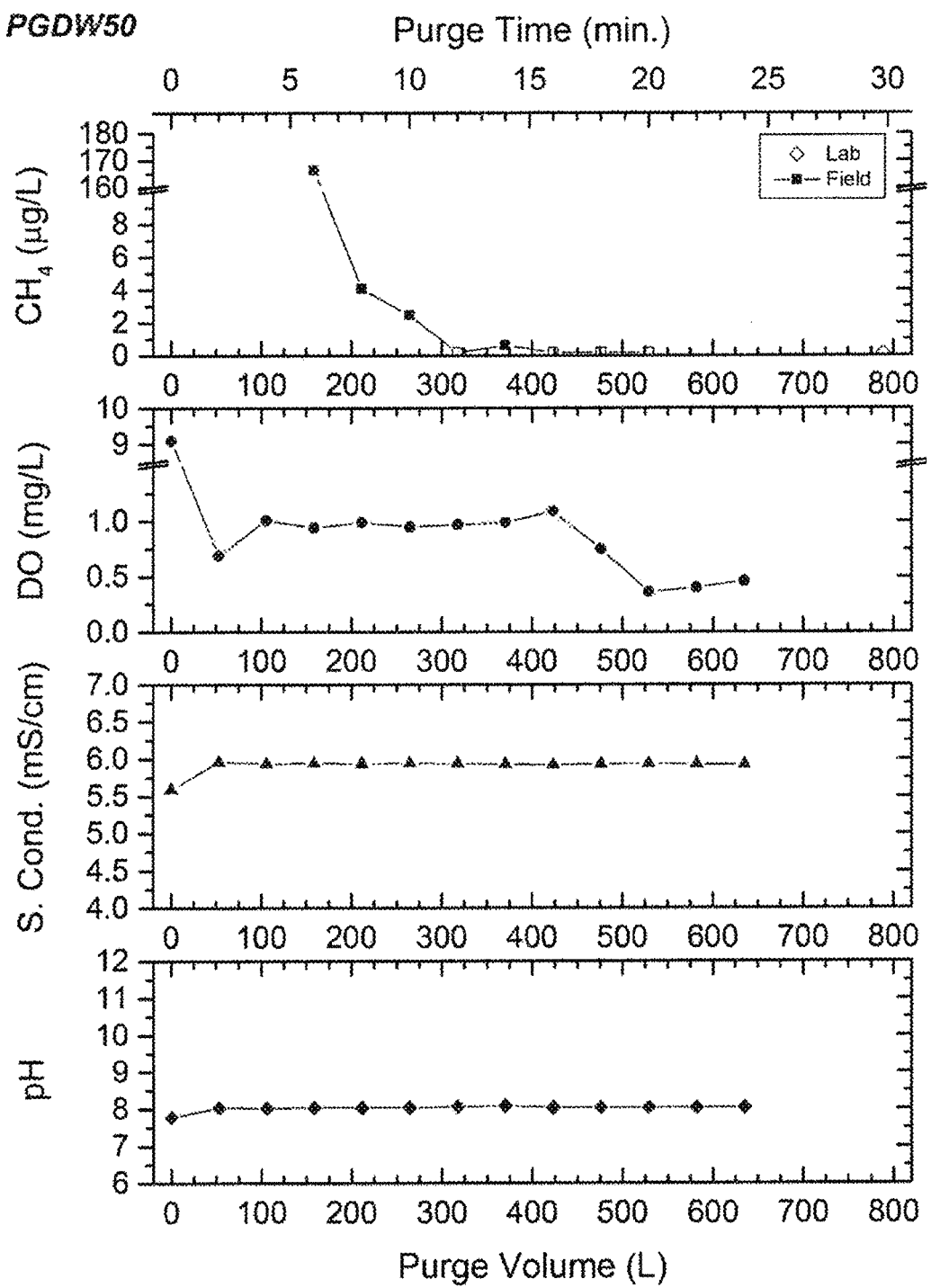
FIG. 15 shows purge results comparing aqueous methane concentrations against dissolved oxygen (DO), specific conductance, and pH for PGDW50 as a function of purge volume and purge time. Several field separator or equilibrator measurements were non-detect (Open squares) and are represented as one-half the MDL (0.2 µg/L), (Estimated from TVA-1000B manual specifications.) The lab sample for methane was non-detect and is represented as one-half the MDL (0.15 µg/L).
Figure 16:
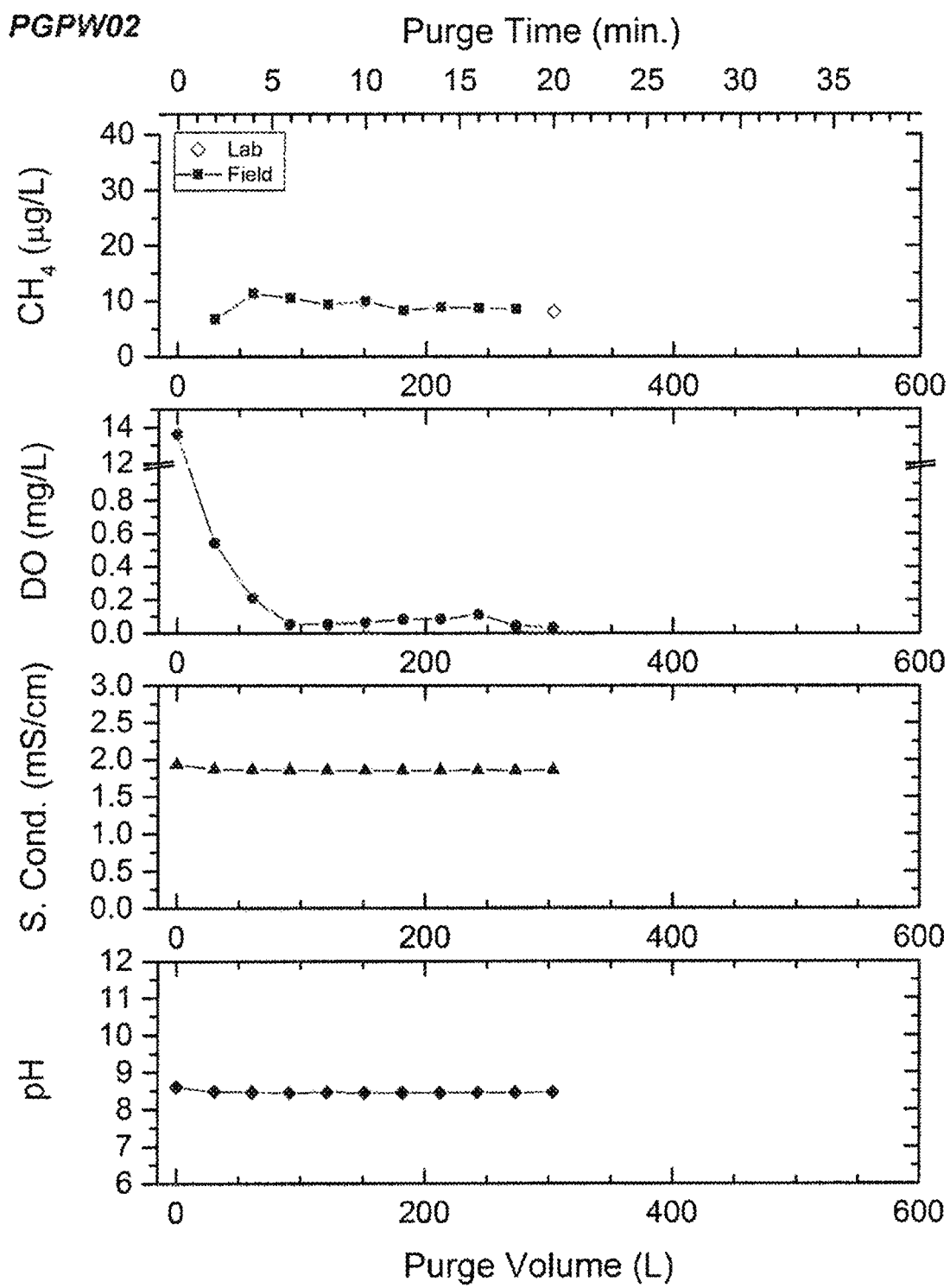
FIG. 16 shows purge results comparing aqueous methane concentrations against dissolved oxygen (DO), specific conductance, and pH for PGPW02 as a function of purge volume and purge time.
Figure 17:
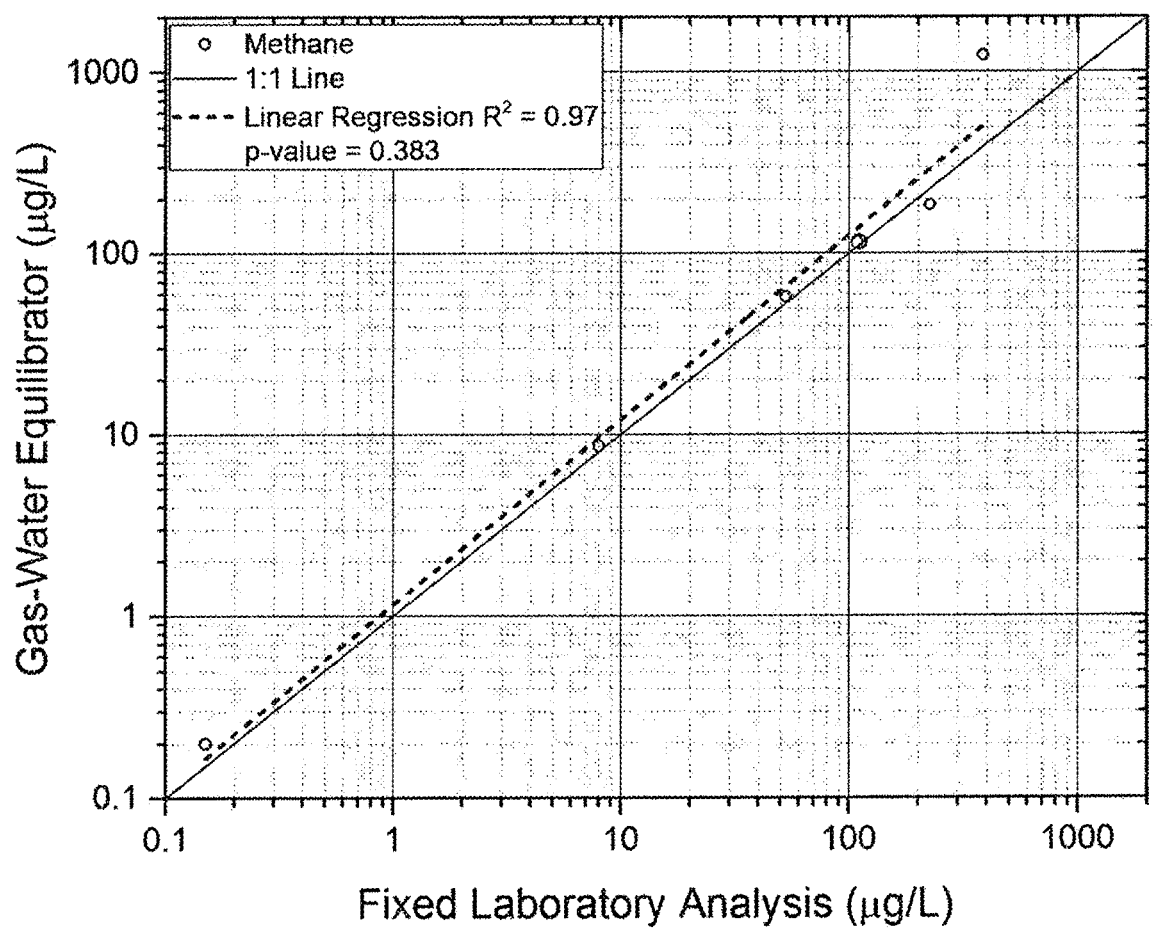
FIG. 17 shows methane concentrations for the average of the final three separator or equilibrator field aqueous measurements for each well location compared to fixed laboratory analysis.

Embodiments of the invention may be used to separate or equilibrate most any gas contained within most any liquid. In the following examples, the separated gas will be a hydrocarbon, and more specifically methane, and the liquid will be water.

Referring to the Figures, rapid transfer of methane, or other hydrocarbon or non-hydrocarbon gas constituents such as carbon dioxide, nitrogen, hydrogen, hydrogen sulfide, or other gases, from water to air is achieved through the combination of venturi tube 220 and gas-water mixing 210 which include the use of venturi ejector 225, which may also be referred to as an injector, and static mixer 215 arranged in sequence. Additional separation of methane occurs in separation 200 as water drops into gas-tight plenum 20, causing turbulence within the inner tube that penetrates the water barrier within gas-tight plenum 20, and allowing methane to transfer to the gas phase. The primary commercial use of venturi ejectors, for example venturi ejector 225, and static mixers, for example static mixer 215, is aeration of wastewater. Concentrations of methane are continuously measured during continuous replacement of air and water volumes in the separator or equilibrator. The separator or equilibrator is contained within housing 10 and includes components on the front, back, and sides.

Water is pumped from water source 145 at water acquisition 240, which could be a well containing ground water, or a stream, lake, or other water source, and is directed to water distribution 235, which includes hydrant or faucet 140. The water stream is then split four ways using manifold splitter 135. A splitter of another configuration that splits more or less ways may be used. Water directed to sample collection 260 through tube 121 is used for collecting laboratory samples. Water directed to geochemical monitoring 255 through tube 122 passes through a commercial flow cell fitted with multi-parameter probes that are connected to the appropriate instrument for monitoring of pH, specific conductance, conductivity, total dissolved solids, oxidation reduction potential, dissolved oxygen, temperature, and any other parameters necessary during parameter recording 250. Water directed to excess discharge 245 through tube 123 is any additional water not being directed to sample collection 260, geochemical monitoring 255, and water gaging 230 and is discharged for disposal. The water directed towards the separator or equilibrator processes through tube 120, first passes through water gaging 230 which contains water flowmeter 40 that regulates the flow rate to the desired rate. Water then enters the venturi ejector 225 inlet, within venturi tube 220, and is constricted to a small diameter opening causing the water to pass through at a high velocity. The increased velocity is accompanied by a pressure drop at the opening, which is less than atmospheric, that passively draws in air through a small diameter tube at the bottom of venture ejector 225. Air that enters venture ejector 225 first begins at air entry 265. Atmospheric air is passively injected at air entry 265, whereas the rate is controlled by the suction created within venture ejector 225. Before entering venturi tube 220, the atmospheric air passes through air cleaning 270, which includes hydrocarbon trap 275 and inlet tube 310, to ensure no outside hydrocarbons are introduced to the system. The rate of injection is monitored at gas flow rate 280, using flowmeter 285, which is connected by tube 354 and tube 355. The atmospheric air then enters venturi tube 220 through a small diameter tube at the bottom of venture ejector 225 using tube 350. Passive flow of atmospheric air into venturi tube 220 eliminates the need for injection of gas or air via a pump into the water stream. Other inert gases such as nitrogen, argon, etc. may be used in place of atmospheric air that is passively injected at air entry 265. Flow through venturi ejector 225 is highly turbulent and rapidly creates new interfaces for transfer of methane from the water to gas phase. During venturi tube 220, air is introduced into the water via a large number of small bubbles resulting in turbulent two phase, i.e. gas and water, bubble flow and a large area of gas-water contact around the bubbles to enhance the transfer of methane from the water to the gas phase. The pressure differential across venturi ejector 225 must remain great enough to passively inject atmospheric air. Transfer rates of constituents, such as methane, within venturi ejectors, such as venture ejector 225, exceed conventional gas-liquid mixing systems such as stirred tanks, bubble columns, and packed columns. The venturi ejector 225 performance is controlled by inlet and throat diameters, downstream pipe length, and air/water flow rates and varies by commercial venture ejectors. After passing through venturi ejector 225, the air-water mixture flows through static mixer 215 at gas-water mixing 210. Venturi ejector 225 and static mixer 215 are connected by coupler 12. Static mixers, or motionless mixers, contain internal elements, e.g. blades or helices, installed in pipes, columns, and reactors that provide increased areas of gas-water contact, a uniformed distribution of concentration and temperature, radial mixing, and lengthened gas-liquid contact times. The effectiveness of redistribution is dependent on the design feature of the elements, e.g. blades or helices, and number of elements used. Similar to venturi devices, concurrent water and air flow in static mixers, e.g. static mixer 215, results in generation of small relatively uniform bubbles resulting in bubble flow and enhanced transfer of methane or other constituents between water and air. Air-water mixtures with bubbles have the potential to coalescence, i.e. lump or group together, but are broken to smaller bubbles upon contact with elements, e.g. blades or helices, within static mixers, e.g. static mixer 215, because of shear, therefore enhancing volumetric gas-liquid mass transfer rates, i.e. the transfer of a constituent from water to air, and coefficients. Use of venturi ejector 225 preceding static mixer 215 eliminates the need to inject air into the static mixer static mixer 215.

Water exiting static mixer 215, as part of gas-water mixing 210, is discharged into gas-tight plenum 20 at separation 200 for additional gas-water separation as water drops into gas-tight plenum 20, i.e. via a free overfall jet stream, causing turbulence within the inner tube that penetrates the water barrier within gas-tight plenum 20, and allowing methane, or other constituents such as carbon dioxide, hydrogen sulfide, or nitrogen, to transfer to the gas phase. A free overfall jet plunging into water downstream further enhances mass transfer, i.e. transfer of compound from water to air, and the mass transfer decreases with increasing downstream pipe length from a venturi device, i.e. the shorter the lengths of pipe/connections, e.g. coupler 12, after venture ejector 225 the better the mass transfer.

Water exits gas-tight plenum 20 by moving downward through the inner tube, then upward inbetween the inner and outer tube, and finally overflowing over the top of outer tube and moving downward exiting through the bottom. The gas phase, which contains the methane, or constituent of interest, exist gas-tight plenum 20 through the top. Water that exits gas-tight plenum 20 is collected at collection 295 using container 30, and is then disposed of at disposal 290. The configuration of gas-tight plenum 20 can also be altered such that it consists of a single tube at a desired length with a regulating valve on the bottom used to keep water in the bottom of the tube and a gas-tight setup.

Before entering the measurement instrumentation for analysis, the gas stream that left the top of gas-tight plenum 20, at separation 200, passes through moisture trap 15 at initial moisture removal 185. Moisture trap 15 removes water moisture from the gas stream, preventing any interference and measurement instrumentation damage. A gas sample for laboratory analysis can be collected at gas sample collection 175 using port 505. To use port 505, toggle valve 490 is closed, directing the entire gas stream to port 505. Port 505 and toggle valve 490 are connected to assembly 300. Assembly 300 is the combination of port 504, toggle valve 495, coupler 507, port 505, coupler 508, port 475, coupler 509, toggle valve 490, and port 506 which are connected in sequence.

Gas pressure is monitored with differential pressure gage 181 or another pressure measuring device, at system pressure 180 and connected to gas stream at port 475 using tube 370, and adjusted through relief valve 170 and relief valve 171 to prevent gas-tight chamber 20 from dewatering, due to excess pressure in the inner tube, and to prevent excessive pressure buildup near instrumentation intakes at gas analysis 115 and gas analysis 150. An additional safety factor is built in by using toggle valve 495 which stops all flow from continuing in the process setup, thereby protecting that gas measurement instrumentation from water damage. Toggle valve 495 is used primarily if water floods gas-tight plenum 20, usually due to the measurement instrumentation gas demand being larger than the available gas phase, and water begins to exit out of the top. When toggle valve 495 is closed, relief valves 170 and 171 are opened to allow atmospheric air to flow to the measurement instrumentation, preventing damage to the instrumentation due to the restricting gas flow and low pressure. Port 475 and toggle valve 495 are connected to assembly 300. After gas passes through assembly 300, it enters splitter 400 through tube 344 and tube 345 which is connected to port 506. Splitter 400 allows for the gas stream to be bypassed towards relief valve 170 and relief valve 171 through tube 395 and tube 397. When relief valve 170 is open, the gas stream exits the system through tube 396, and when relief valve 171 is open, the gas stream exits through tube 398. The other outlet on splitter 400 is connected to gas dryer 90 through tube 390.

Gas dryer 90, which can consist of materials such as Nafion®, is also used to remove water moisture from the gas stream, preventing any interference and instrumentation damage. Gas dryer 90 contains an inner tube (such as Nafion) that carries the gas sample through the inside, but wicks water through the tube by passing a dry gas on the outside of the tube that is counter current. The dry gas begins at drying entry 55 which is atmospheric, or ambient, air. Peristaltic pump 50 draws in air at pumping 65 from drying entry 55 into tube 375 which is connected to either hydrocarbon trap 75 at contamination mitigation 70 or moisture trap 85 at air dryer 80 through tube 376. Similar to hydrocarbon trap 275 at air cleaning 270, hydrocarbon trap 75 ensures no outside hydrocarbons are introduced to the system or gas stream running counter current to the inner tube in gas dryer 90. If hydrocarbon trap 75 is used, it is connected to moisture trap 85 at air dryer 80 using additional tubes similar to tube 375, tube 376, tube 359, and tube 360. Moisture trap 85 removes the moisture from the incoming atmospheric air before passing into gas dryer 90. Moisture trap 85 is connected to gas dryer 90 using tube 359 and tube 360. After the dry air passes across the inner tube in gas dryer 90, it exits at dry gas vent 165.

After the gas sample passes through gas dryer 90, the rate at which the measurement instrumentation is sampling the gas is monitored at instrumentation demand 95 using flowmeter 100 connected by tube 385. Measurement of the flow rate using flowmeter 100 is important to understanding measurement instrumentation readings if the nominal flow rate is not achieved. An optional hydrocarbon trap 110 may be introduced at sample filter 105 to remove additional hydrocarbons if methane is the sole constituent of interest since methane isn't removed by some hydrocarbon traps. The gas phase sample then leaves flowmeter 100 and enters splitter 330 via tube 335. Splitter 330 allows for the gas stream to be directed to ports 500 through tube 365, tube 366, and tube 367. The ports 500 are used to connect to measurement instrumentation, e.g. various analytical instrumentation for measuring constituents in the gas phase. Any number of the ports 500 may be used as long as the measurement instrumentation gas demand is satisfied. More or less of the port 500s and connecting tubes may be used depending on the splitter 330 configuration.

The gas stream is then directed, using tube 130 and tube 131, to measurement instrumentation such as an IRGA 25, e.g. LandTec GEM 2000, at gas analysis 115 and TVA 35, e.g. Thermo Scientific Toxic Vapor Analyzer (TVA-1000B), at gas analysis 150 for real-time data analysis. The GEM2000 Plus, i.e. IRGA 25, uses an infrared cell to measure methane in %-volume and is accurate for gas-phase concentration measurements greater than 1.0%. The GEM2000 Plus, e.g. IRGA 25, also has additional sensors capable of measuring 1-12S, CO, $CO_2$, and $O_2$. These additional gases are simultaneously screened for along with methane. The TVA-1000B, e.g. TVA 35, is used to measure lower concentrations of methane on a flame ionization detector below 10,000 ppmv. The instrument also contains a photoionization detector allowing simultaneous detection of additional compounds to methane which may be present. Readings from the field instrumentation are recorded at data logging 155 and allowed to vent as exhaust at exhaust exit 160. Other instrumentation for measuring compounds in the gas-phase may substitute or compliment IRGA 25 and TVA 35

Field gas concentrations measured at gas analysis 115, gas analysis 150, and data logging 155 are then used in the derived mass transfer equation to calculate the initial aqueous concentration.

The principles of the separator or equilibrator are similar to batch air stripping. Batch air stripping is a widely used method for determining Henry's law constants and relies on a dynamic principle developed by Mackay et al. 1979. An inert gas is purged through water, releasing a dissolved compound. Relative concentrations of one phase are measured over time and it is assumed that the exiting gas is in equilibrium. The separator or equilibrator however, increases gas-water interface contact times for mass transfer, decreases equilibrium times, and equilibrates a continuous flow of sample water unlike batch air stripping and other equilibrators.

Tube 120, tube 121, tube 122, and tube 123 may consist of a high density polyethylene (HDPE) tubing that is replaceable to prevent cross contamination from different sampling locations that the separator or equilibrator has been used. Other tubing materials may be used such that it is inert and doesn't cross contaminate the water or gas stream. Tube 130, tube 131, tube 335, tube 344, tube 350, tube 355, tube 360, tube 370, tube 375, tube 385, and tube 390 can consist of a ⅜ inch tube, such as R-3603 Tygon® tubing that is easily replaceable. Other inert tubing materials such as Teflon™ or stainless steel may be used and the tubing size may change depending on user preference. Tube 345, tube 354, tube 359, tube 365, tube 366, tube 367, tube 376, tube 395, tube 396, tube 397, tube 398, and inlet tube 310 are made of ¼ inch stainless tubes. Other tube sizes or materials that do not leach or emit constituents, such as volatile organics, to the gas stream may also be used. All tube connections and ports should be gas tight. Gas tape may be used for fittings and Teflon tape may be used for water connections. Background testing of all tubes, hydrocarbon traps, and moisture removing materials should be conducted using the measurement instrumentation that will be used when the separator or equilibrator is operational to prevent cross contamination, inaccurate results, and understand background concentrations.

Potential modifications include the use of additional venturi ejector and static mixers in various configurations to further enhance mass transfer and enable real-time aqueous analyses of less volatile compounds and introduction of the gas stream directly to a mass spectrometer or other device enabling rapid compound identification.

The gas-water equilibrator was designed to increase gas-water mass exchange rates beyond rates characteristic of commercially available equilibrators. Monitoring of concentration trends during purging allows for a more rigorous comparison of temporal trends between sampling events and comparison of baseline conditions with potential post-impact conditions. Other benefits of the device include real-time information and decision making in the field to help focus an investigation, aid in determining when to collect a sample, save money by limiting costs (e.g. analytical, sample transport, sample storage), and provide an immediate assessment of local methane concentrations, or concentrations of other constituents, relative to the action level for additional investigation.

EXAMPLES

Embodiments of the invention may be used to separate or equilibrate most any gas contained within most any liquid. In the following examples, the separated gas will be a hydrocarbon, and more specifically methane, the liquid will be water. The water tap closest to each wellhead being sampled that did not pass through any treatment system was used to collect dissolved gas ground water samples and monitor field parameters (pH, specific conductance, dissolved oxygen, oxidation reduction potential, temperature). Samples were collected by securing polyethylene tubing (for example Nalgene 489 LDPE ⅜" ID No. 14476-120) to the water tap and placing into an inverted 60 mL serum bottle (for example Wheaton Science #223746) containing a 0.5 g trisodium phosphate (TSP) pellet (sodium phosphate dodecahydrate, ACS, 98-102%) to maintain pH≥10 for sample preservation. The inverted sample bottle and water line were submerged in a 5-gal plastic bucket containing purged ground water. The bottle was slowly turned to an upright position as it filled from the water line. When the bottle was completely filled, the water line was placed near the bottom of the sample bottle and several bottle volumes were replaced before the sample line was removed. All bubbles were allowed to escape (no headspace) as the butyl rubber Teflon-faced septum and aluminum crimp cap were placed on the bottle and sealed while submerged, preventing any atmospheric contact with the sample. The aluminum caps were then crimped for permanent seal. Bottles were filled in duplicates to safeguard against bottle breakage and loss of samples. Samples were stored at ≤6° C. and analyzed within a 14 day recommended holding time.

Methods (RSK175v5 and RSK194v4) developed internally at EPA's Robert S. Kerr Environmental Research Center in Ada, Okla. were used to analyze methane, ethane, and propane.

Collected samples were allowed to approach room temperature, typically between 18 and 22° C., before laboratory analysis. Headspace generation methods followed Kampbell and Vandegrift and RSK194v4 and 175v5 (Kampbell and Vandegrift 1998; RSKSOP-175v5; RSKSOP-194v4). The initial aqueous concentration is determined by combining the mass of compound in gas and aqueous phases (as determined using Henry's Law Constant) per volume of water. A series of equations are provided in RSK175v5 to determine aqueous concentration from gas phase analysis. We condensed these equations into a single equation:

$$C_W = C_{GC}\left(\frac{MP_{HS}}{RT_{LAB}}\right)\left[1 + \left(\frac{V_{DIL}P_{DIL}}{V_{HS}P_{HS}}\right)\right]\left[\frac{1}{K_H} + \frac{V_{HS}}{V_W}\right] \quad (6)$$

where:
$C_W$=Aqueous concentration (μg L$^{-1}$)
$C_{GC}$=Gas concentration determined from gas chromatography analysis (ppmv)
M=Molecular weight of compound of interest (g/mol)
$P_{DIL}$=Absolute pressure of dilution gas added to headspace (atm)
$P_{HS}$=Absolute pressure of headspace gas (atm) [$P_{ABSOLUTE}=P_{ATMOSPHERIC}+P_{GUAGE}$]
R=Gas constant (0.08206 L atm mol$^{-1}$K$^{-1}$)
$T_{LAB}$=Laboratory temperature (K)
$V_{DIL}$=Volume of dilution gas added to headspace (mL)
$V_{HS}$=Volume of headspace (mL)
$V_W$=Volume of water in serum bottle (mL) [$V_W$=Vol. serum bottle−$V_{HS}$]
$K_H$=Dimensionless Henrys Law Constant at laboratory temperature (μg L$^-$gas$^{-1}$/μg L$^-$water$^1$ The LandTec GEM2000 Plus uses an infrared cell to measure methane (CH$_4$) in %-volume and is accurate for gas-phase concentration measurements greater than 1.0%. The GEM2000 Plus also has additional sensors capable of screening for H$_2$S, CO, CO$_2$, and O$_2$. H$_2$S can be important in sour stray gas investigations such as in Alberta and west Texas. In addition to methane, CO$_2$ is also measured on a dual wavelength infrared cell with reference channel. The CO$_2$ reading is filtered to an infrared absorption frequency 4.29 μm (nominal), the frequency specific to CO$_2$. The CH$_4$ reading is filtered to an infrared absorption frequency of 3.41 μm (nominal), the frequency specific to hydrocarbon bonds. The presence of other light hydrocarbons (e.g. ethane, propane, butane) will result in higher readings of CH$_4$ than is actually present. Oxygen, CO, and H$_2$S are measured (Hydrogen compensated) on an internal electrochemical cells (EC Cell). The 02 cell is a galvanic cell type with no influence from CO$_2$, CO, H$_2$S, SO$_2$, or H$_2$. The Thermo Scientific Toxic Vapor Analyzer (TVA-1000B) is a portable instrument that was used to measure lower concentrations of methane on a flame ionization detector (FID) below 10,000 ppmv. The instrument also contained a photoionization detector (PID) allowing simultaneous detection of additional compounds to methane which may be present.

The instruments were calibrated each day before use and verified against known methane gas standards. The PID was calibrated with isobutylene. Mid-day and end of day calibration verifications were conducted to ensure accurate measurements. All calibrations and verifications were within QC performance with the exception of the PID detector which consistently failed to maintain calibration and provided a low reading bias. Recalibration necessitated removing and cleaning the PID lamp window. Since estimation of methane concentrations was based on FID readings, this had no impact on data quality for methane. The inability to maintain calibration of the PID was surprising given the highly conditioned nature (e.g., GAC filtration of introduced air, moisture removal) of the air stream prior to entry to the PID. PIDs are known to be very sensitive (negative bias) to relative humidity in an air stream. A detailed outline of QC requirements, instrument specifications, and calibration and verification performance is summarized in Table 1.

A YSI multiparameter probe was used for the measurement of pH, oxidation reduction potential, specific conductance, dissolved oxygen, and temperature of ground water during a well purge. Before field use, the instrument was calibrated and verified against known standards. Performance of each probe was also verified mid-day and at the end of the day versus standards.

Aqueous samples were collected and analyzed on an Agilent Micro 3000 Gas Chromatograph (GC) equipped with a thermal conductivity detector (TCD) to analyze fixed gases ($H_2$, $O_2$, $N_2$, $CO_2$, CO) and light hydrocarbons (C1-C9) in straight chain, branched, or cyclic forms. The micro GC is comprised of four modules, each having a sample loop, injector, pre-column, analytical column, and detector. The column, injector, and detector temperatures are all independently controlled resulting in four simultaneous independent measurements for each sample. A gas phase helium or argon blank is analyzed prior to and after analysis of standards. These blanks are used to detect the presence of background analyte concentrations or interferences in the analytical system. Field, trip, and equipment blanks are prepared and analyzed exactly the same way as samples. Gas phase reporting limits for methane, ethane, ethylene, acetylene, propane, and butane are near their lowest calibration standards of 10 ppmv using multiple point calibration. The method detection limit (MDL) for each compound is determined from seven runs at the lowest calibration standard using a Student's t-test at a 99% confidence level with n−1 degrees of freedom. MDLs are typically between 0.5-1.0 ppmv. Similarly, reporting limits for $H_2$ and $CO_2$ are 20 ppmv and 100 ppmv, respectively. Samples analyzed on the GC had an aqueous MDL and reporting limit for methane of 0.3 μg/L and 1.3 μg/L dissolved methane, respectively. A summary of quality control information is provided in Table 1.

A series of QC samples were collected which included trip blanks, field blanks, and equipment blanks (Table 2). These QC samples were filled with Barnstead NANOpure Diamond UV water and were preserved with a trisodium phosphate (TSP) pellet (sodium phosphate dodecahydrate, ACS, 98-102%) and stored and analyzed in an identical method to the field samples. Trip blanks were used to assess potential contamination from sampling, storage, and shipment to and from the field. Field blanks were used to assess potential contamination from sample bottles and environmental sources. Equipment blanks were used to assess potential contamination from sampling equipment, cleaning procedures, or sample preservation. Field QC also included field duplicate samples meant to represent the precision of sampling, analysis, and site heterogeneity. Temperature blanks were included to measure the temperature of samples in storage until analysis.

Methane was detected in field blank FieldBlk02 (12 μg/L) and equipment blank EquipBlk02 (12 μg/L) and were collected on Apr. 18, 2012. These blanks were shipped with field samples PGDW05 (Apr. 18, 2012) and PGPW02 (Apr. 20, 2012). These two field samples have been flagged since the methane in the blank samples was above the quantitation limit and the sample concentrations for methane were less than 10 times the concentration found in the blank. Detection of propane in FieldBlk02, and ethane and propane in EquipBlk02 likely indicate laboratory contamination of these blanks since neither ethane nor propane was detected in field samples PGDW05 and PGPW02. PGPW02 was collected two days after the blank samples and PGDW05 was collected the same day as the blank samples. Samples from PGDW20 were collected on Apr. 16, 2012, samples PGDW23 and PGDW30 were collected on Apr. 17, 2012, and sample PGDW50 was collected on Apr. 19, 2012. Field and equipment blanks associated with these samples and dates show no detection of methane, ethane, or propane.

Domestic water wells were sampled as part of a larger ground water investigation in the Pavillion oil and gas field near Pavillion, Wyo., and are within the Wind River Basin (Illustration 1) (DiGiulio et al. 2011). Ground water samples from domestic wells were collected to evaluate potential stray gas migration as a result of gas production well completion activities. The Wind River Formation is the main formation used for domestic, agricultural, industrial, and municipal water supply.

Four domestic wells (PGDW05, PGDW20, PGDW23, PGDW30), one municipal water well (PGPW02), and one agricultural well (PGDW50) were sampled. Aqueous methane concentrations measured on the separator or equilibrator ranged from non-detect to 1470 μg/L. Homeowner's existing submersible pumps were used to pump water from the wells.

Well PGDW05. PGDW05 is a domestic well with a depth of 64 m. Methane concentrations exhibited periodic variations with an overall increasing trend with purge volume (Graph 2A). The homeowner's water-well setup directed water into a 50 gallon (189 L) storage tank at outlet of the well. After the tank volume was exchanged, the well was allowed to recover for 45 minutes before re-purging. Approximately 2.6 tank volumes were purged before collecting the fixed laboratory dissolved gas sample for comparison to the separator or equilibrator. The final three separator or equilibrator field aqueous measurements had an average of 57.9 μg/L dissolved methane. Fixed laboratory analysis reported 53 μg/L dissolved methane. This value however was flagged due to the presence of methane in field and equipment blanks. Methane had been detected at this domestic well during previous sampling events at 17, 5.4, and 65 μg/L. FID readings corrected for background (4.1 ppmv) and flow rate were as high as 160 ppmv. The pH and specific conductivity rapidly stabilized during the purge and dissolved oxygen rapidly decreased to be between 0.01 and 0.11 mg/L (Graph 3).

Additional samples collected as part of a larger sampling scheme detected the presence of lowlevel gasoline range organics (GRO) and diesel range organics (DRO) at 48 and 63.5 μg/L, respectively. During operation of the separator or equilibrator, the PID detector on the TVA1000B had fluctuating responses up to 1.29 ppmv (above background) indicating additional dissolved constituents besides methane (likely the GRO and DRO). Because methane has an ionization potential around 12.5 eV, it is not detected by the PID. The PID response was low relative to the FID, so the influence on the FID reading was insignificant.

Well PGDW20. PGDW20 is a domestic well with a depth of 140 m. Measurements on the separator or equilibrator started at approximately 3,400 L purge volume (Graph 2B). The data indicate no increasing or decreasing trends, but show some variability with purge volume. The final three separator or equilibrator field aqueous methane measurements had an average of 115.4 μg/L dissolved methane. Fixed laboratory analysis reported 111 μg/L and 108 μg/L (duplicate sample) dissolved methane. FID readings corrected for background (−0.34 ppmv) and flow rate were as high as 381 ppmv. Dissolved oxygen was initially elevated and rapidly decreased to <0.1 mg/L. Specific conductivity and pH stabilized after 2,000 L purge volume (Graph 4).

Well PGDW23. PGDW23 is a domestic well with a depth of 152 m. Aqueous methane concentration increased until reaching a purge volume of 1,000 L (Graph 2C). After a 1,000 L purge volume, separator or equilibrator methane concentrations gradually decreased for the remainder of the well purge. This could indicate potential pre-purge ambient flow across the screened interval, short-circuiting across the cement sheath above the screened interval, or effects of physical and chemical heterogeneity. The final three separator or equilibrator field aqueous methane measurements had an average of 184.6 µg/L dissolved methane. Fixed laboratory analysis reported 226 µg/L dissolved methane. FID readings corrected for flow rate were as high as 771 ppmv (background=0.0 ppmv). The pH, specific conductivity, and dissolved oxygen rapidly stabilized (Graph 5).

Well PGDW30. PGDW30 is a domestic well with a depth of 79 m. Among all the wells sampled, PGDW30 had the highest aqueous methane concentrations (Graph 2D). Unlike the locations mentioned earlier, the aqueous methane concentration initially decreased before increasing. A significant difference existed between field and laboratory analysis. The final three separator or equilibrator field aqueous methane measurements had an average of 1,234.7 µg/L dissolved methane. Fixed laboratory analysis reported 384 µg/L dissolved methane. FID readings corrected for background (1.16 ppmv) and flow rate were as high as 4,027 ppmv.

After 800 L purge volume, dissolved oxygen began to rapidly increase from around 0.05 mg/L to 0.44 mg/L and FID readings started to decrease. Specific conductivity and pH remained stabilized (Graph 6). Possible reasons for discrepancy between the separator or equilibrator and laboratory values include: (1) potential water from another source (not representative of the water already purged) entered the system and had lower aqueous methane concentrations when the laboratory sample was collected, (2) an improper seal on the crimp cap for the sample bottle caused a loss of methane before laboratory analysis (which would not be related to the increase in dissolved oxygen), or (3) methane exsolved from the ground water as it was pumped to the surface because of changes in partial pressure which resulted in a decreased aqueous concentration in the laboratory sample. The separator or equilibrator is capable of measuring dissolved or free gas, therefore would still measure exsolved methane.

Additional samples collected as part of a larger sampling scheme detected the presence of gasoline range organics (GRO) and diesel range organics (DRO) at 27.3 µg/L, and 43.8 µg/L, respectively. During operation of the separator or equilibrator, the PID detector on the TVA1000B had an increasing response up to 0.56 ppmv (above background), indicated additional dissolved constituents besides methane (likely the GRO and DRO). The PID response was low relative to the FID, so the influence on the FID reading was insignificant.

Well PGDW50. PGDW50 is an agricultural well with a depth of 61 m. Aqueous methane measurements on the separator or equilibrator began after 159 L purge volume and indicated the presence of dissolved methane (Graph 2E). Aqueous concentration decreased to levels below detection. The final three separator or equilibrator field aqueous methane measurements were all non-detect. Fixed laboratory analysis of dissolved methane also reported a non-detect value (<1.3 µg/L). FID readings corrected for background (2.25 ppmv) and flow rate were as high as 166 ppmv which occurred at the beginning of purging.

PGDW50 had the highest specific conductivity of all wells sampled and rapidly stabilized. Dissolved oxygen levels were also the highest in all wells sampled and stabilized near 1 mg/L and continued to drop when methane was no longer detected (Graph 7). This water-well is located in an area with heavy cattle traffic and manure, and could explain initial detection of methane. Methane may not be a characteristic of the local water formation, but rather due to potential connectivity (infiltration) between the surface and casing well-water. It was not until the stagnant casing water was removed that actual aquifer properties were measured.

Well PGPW02. PGPW02 is a municipal well with a depth near 154 m. Aqueous methane concentrations were fairly stable for the entire purge (Graph 2F). The final three separator or equilibrator field aqueous methane measurements had an average of 8.6 µg/L dissolved methane. Fixed laboratory analysis reported 8 µg/L dissolved methane for both the sample and sample duplicate. These values however were flagged due to detection of methane in blanks. FID readings corrected for background (4.5 ppmv) and flow rate were as high as 17 ppmv. The pH, specific conductivity, and dissolved oxygen rapidly stabilized (Graph 8).

A paired t-test was used to determine if a significant difference exists between the field separator or equilibrator method and the fixed laboratory method. It is assumed that the differences in field and laboratory methods are normally distributed and the null hypothesis is defined as no difference between the separator or equilibrator method and fixed laboratory method. Applying the paired t-test yields a t-statistic of 0.9555 and a p-value of 0.38321. At the 0.05 level, the pvalue>0.05. We fail to reject the null hypothesis and conclude that there is not enough evidence to suggest a significant difference between the separator or equilibrator method and fixed laboratory method.

In this investigation, FID response to the presence of other light hydrocarbons (ethane, propane, butane) and organic compounds evident in GRO and DRO analyses was insignificant compared to methane eliminating the need for a hydrocarbon trap (granular activated carbon) prior to the FID. However, a carbon trap will be used in future studies to ensure that other hydrocarbons do not interfere with estimating of methane concentrations.

Practical use of this equilibrator is dependent upon rapid mass transfer of methane from water to air. Non-attainment of equilibrium would result in a negative bias in field estimation of aqueous methane concentrations compared to fixed laboratory values. A negative bias was not observed in this study (Graph 9) suggesting that the combined use of the venturi ejector, static mixer, and free overfall jet stream resulted in rapid and near equilibrium conditions for liquid-gas exchange for methane.

Mass transfer can be evaluated by determining the mass transfer coefficient necessary for attainment of near equilibrium conditions using this separator or equilibrator. Mass transfer of methane from water to gas can be described by $$V\frac{dC_W}{dt} = -\kappa A\left(C_W - \frac{C_G}{K_H}\right) \tag{7}$$

This equation does not incorporate source/sink terms for methane since rates of $CH_4$ production or degradation are likely insignificant compared to the mass exchange rate. The term A/V or 'a' ($cm^{-1}$) is often called the specific surface area or interfacial area. The mass transfer coefficient K (cm $s^{-1}$) is broken into two terms representing liquid ($\kappa_L$) and gas resistance ($\kappa_G$)

$$\frac{1}{\kappa} = \frac{1}{\kappa_L} + \frac{1}{K_H \kappa_G} \tag{8}$$

For noncondensable gases such as oxygen and methane, or compounds with a high Henry's Law Constant greater than $10^{-3}$ atm–m$^3$/mol, resistance to mass transfer is liquid phase controlled and $\bar{\kappa}=\kappa$, (Thomas 1982).

Integration of equation 7 gives $$\frac{C_W(t) - C_G/K_H}{C_W(i) - C_G/K_H} = \exp(-\kappa_L at) \qquad (9)$$

where $\kappa_L a$ (s$^{-1}$) is a lumped parameter combining $\kappa_L$ and the interfacial area. This equation has been used with upstream and downstream dissolved oxygen concentrations to estimate $\kappa_L a$ values for venturi devices and static mixers (Chisti et al. 1990; Goto and Gaspillo 1992; Heyouni et al. 2002). The Henry's Law Constant and enthalpy of solution (temperature adjustment) for oxygen are virtually identical to methane (Sander 1999). For oxygen aeration studies using venturi ejectors, this equation is rearranged and expressed in terms of an oxygen transfer efficiency (Baylar and Ozkan 2006) factor E or a collection efficiency factor (Agrawal 2013)

$$E = \frac{C_W(t) - C_W(i)}{C_G/K_H - C_W(i)} = 1 - \exp(-\kappa_L at) \qquad (10)$$

Rapid mass transfer is denoted by values of E approaching 1.0. In this equilibrator, time for mass transfer was approximately 10 seconds which included exchange in the plenum, venturi ejector and static mixer. For an efficiency factor of 0.95, this corresponds to a $\kappa_L a$ value of 0.3 s$^{-1}$.

Mass transfer coefficients for venturi ejectors and static mixers in single use have achieved mass transfer coefficients in excess of 0.3 s$^{-1}$ (Marquez et al. 1994; Heyouni et al. 2002). However, reported $\kappa L_a$ values for venturi devices and static mixtures vary by orders of magnitude and are highly dependent on design factors and temperature. Evans et al. (2001) measured $\kappa_L a$ values ranging from 0.1 s$^{-1}$ to 0.5 s$^{-1}$ for a jet venturi. However, a number of studies though indicate poorer performance. Cramers and Beenackers (2001) measured $\kappa_L a$ values from 0.015 s$^{-1}$ to 0.03 Dong et al. (2012) compared one to three venturi devices in parallel and series configurations (6 trials) and measured mass transfer coefficients for oxygen from 0.0009 s$^{-1}$ to 0.0033 s$^{-1}$ at 20° C. with the most efficient design having three venturi devices in parallel. Ozkan et al. (2006a) conducted extensive testing (72 trials) of venturi devices having design features and mass transfer coefficients for oxygen from 0.0002 s$^{-1}$ to 0.0187 s$^{-1}$ at 20° C. Park and Yang (2013) tested 10 tube tip and annular nozzle area configurations and measured mass transfer coefficients for oxygen ranging from approximately 0.0008 s$^{-1}$ to 0.008 s$^{-1}$. Rodriguez et al. (2012) measured a $\kappa_L a$ value of 0.007 s$^{-1}$ for a venturi ejector in oxygen aeration experiments. Utomo et al. (2008) examined mass transfer coefficients for oxygen for 5 design configurations. Mass transfer coefficients ranged from approximately 0.05 s$^{-1}$ to 0.07 s$^{-1}$.

Static mixers are often combined with airlift systems to enhance aeration of water. Zhu et al. (1992) summarized data from Middleton (1978) and plotted mass transfer coefficients for bubble flow using motionless mixers. $K_L a$ values increased with energy dissipation from 0.1 s$^{-1}$ to 5 s$^{-1}$. Heyouni et al. (2002) evaluated the effect of increasing water and gas velocity on effectiveness of static mixers. $K_L a$ values varied from approximately 0.1 s$^{-1}$ for water and gas velocities of 0.70 m/s and 0.016 m/s, respectively to 2.2 s$^{-1}$ for water and gas velocities of 1.30 m/s and 0.437 m/s, respectively. Water and air velocities through the static mixer in this equilibrator were approximately 0.5 m/s indicating that a mass transfer coefficient of 0.3 s$^{-1}$ was achievable. However, similar to venturi devices, other studies indicate poorer performance. Chisti et al. (1990) evaluated the effect of gas velocity on aeration of aqueous salt solutions. KLa values for oxygen varied from 0.006 s$^{-1}$ to 0.03 s$^{-1}$. $K_L a$ values increased with increased gas velocity. Goto and Gaspillo (1992) evaluated the effect of water and gas velocity on aeration of water. $K_L a$ values for oxygen varied from 0.004 s$^{-1}$ to 0.05 s$^{-1}$. $K_L a$ values increased with increased gas and water velocity.

We could find no published mass transfer coefficients for the combined use of venturi ejectors and static mixtures as used in this device. With such extreme variability in reported mass transfer coefficients in the literature, it is apparent that mass transfer studies specific to this design are necessary for rigorous evaluation of attainment or near attainment of equilibrium under various operating conditions. However, good agreement between equilibrator and fixed laboratory values suggest the configuration used here achieved rapid mass transfer.

To enable real-time monitoring of aqueous methane concentrations during ground water purging, a gas-water equilibrator was designed to increase gas-water mass exchange rates beyond rates characteristic of commercially available equilibrators. Real-time monitoring of methane during purging is necessary to evaluate the effect of inadequate removal of stagnant casing water prior to sample collection and the potential effects of pre-purge ambient borehole flow and surrounding physical and chemical heterogeneity—effects common to long screened domestic and monitoring wells. Monitoring of concentration trends during purging allows for a more rigorous comparison of temporal trends between sampling events and comparison of baseline conditions with potential post-impact conditions. Other benefits of the device include real-time information and decision making in the field to help focus an investigation, aid in determining when to collect a sample, save money by limiting costs (e.g. analytical, sample transport, sample storage), and provide an immediate assessment of local methane concentrations relative to the action level for additional investigation.

Dissolved methane concentrations determined on the separator or equilibrator were in excellent agreement to reported fixed laboratory data with the exception of PGDW30 (Graph 9) which may be due to changing conditions toward the end of purging. Variations in methane concentrations during purging were observed for all locations. Similar observations have also been reported by other researchers (Harder et al. 1965).

While: (1) a negative bias for field separator or equilibrator data in comparison to fixed laboratory data was not evident, (2) a significant decrease in gas phase oxygen concentration occurred subsequent to gas-water mixing, and (3) a number of literature studies indicate that mass transfer from water to gas in venturi ejectors and static mixers can be sufficiently rapid to ensure attainment of equilibrium. There is nevertheless extreme variation in literature values for mass transfer coefficients which indicate attainment of equilibrium cannot be guaranteed using these devices. Additional field and laboratory-based experimentation and potential modification of this device are necessary to justify use beyond screening at this time.

Potential modifications include the use of additional venturi ejector and static mixers in various configurations to further enhance mass transfer and enable real-time aqueous analyses of less volatile compounds and introduction of the gas stream directly to a mass spectrometer or other device enabling rapid compound identification.

TABLE 1

Instrumentation and Quality Control (QC)

| Analyte | Instrument (Detector) | Range | Calibration Standard | Verification Standard | QC Requirements (Frequency) | Stated Accuracy |
|---|---|---|---|---|---|---|
| CH4 | LandTec GEM2000 Plus (IRGA) | 0-100% | 50% | 2.5%, 50% | ±1% of readings (beginning & end of each sample event) | ±0.3% (0-5%) ±1.0% (5-15%) ±3.0% (15-100%) |
| CO2 | LandTec GEM2000 Plus (IRGA) | 0-100% | 35% | 5%, 20%, 35% | ±1% of readings (beginning & end of each sample event) | ±0.3% (0-5%) ±1.0% (5-15%) |
| CO | LandTec GEM2000 Plus (EC Cell) | 0-2000 ppmv | 100 ppmv | 100, 500, 1000 ppmv | ±10% of readings (beginning & end of each sample event) | ±10% (0-2000 ppmv) |
| O2 | LandTec GEM2000 Plus (EC Cell) | 0-21% | 20.9% | 4%, 10%, 20.9% | ±1% of readings (beginning & end of each sample event) | ±1.0% (0-5%) ±1.0% (5-21%) |
| H2S | LandTec GEM2000 Plus (EC Cell) | 0-500 ppmv | 25 ppmv | 25, 100 ppmv | ±10% of readings (beginning & end of each sample event) | ±10% (0-500 ppmv) |
| VOCs | Thermo Scientific TVA-1000B (FID) | 1.0-10,000 ppmv | 0.0, 10, 100, 1000, 10000 ppmv CH4 | 10, 100, 1000, 10000 ppmv CH4 | 90-110% of known values (after calibration, beginning & end of each sample event) | ±25% or ±2.5 ppmv, whichever is greater, from 1.0 to 10000 ppmv |
| VOCs | Thermo Scientific TVA-1000B (PID) | 0.5-500 ppmv | 0.0, 10, 100, 225 ppmv Isobutylene | 10, 100, 225 ppmv Isobutylene | 80-120% of known values (after calibration, beginning & end of each sample event) | ±25% or ±2.5 ppmv, whichever is greater, from 0.5 to 500 ppmv |
| Dissolved Gases | Agilent Micro 3000 Gas Chromatograph (TCD) RSKSOP 194v4 & 175v5 | ~0.001-100 MOLE % determined by calibration | Refinery Gas Standards #7 (Methane UHP 26.864%) & #5 (Methane UHP 4.979%) and Natural Gas Standard #1 (Methane UHP 94.686%) | Refinery Gas Standards #7 & #5 and Natural Gas Standard #1 | ±85-115% of known values (After He/Ar blank at first of analysis queue, before He/Ar blank at end of sample set, and every 15 samples) | ±85-115% |

TABLE 2

Fixed laboratory results for collected dissolved gas samples and blanks

| Sample ID | Date | Methane (74-82-8) | Methane QC | Ethane (74-84-0) | Ethane QC | Propane (74-98-6) | Propane QC | Butane (106-97-8) | Butane QC |
|---|---|---|---|---|---|---|---|---|---|
| Units | | µg/L | | µg/L | | µg/L | | µg/L | |
| MDL | | 0.3 | | 0.5 | | 0.7 | | 0.7 | |
| QL | | 1.3 | | 2.7 | | 3.8 | | 4.7 | |
| PGDW05-0412 | Apr. 18, 2012 | 53 | B (Blk02) | <2.7 | U | <3.8 | U | <4.7 | U |
| PGDW20-0412 | Apr. 16, 2012 | 111 | | 8 | | <3.8 | U | <4.7 | U |
| PGDW20d-0412 | Apr. 16, 2012 | 108 | | 7 | | <3.8 | U | <4.7 | U |
| PGDW23-0412 | Apr. 17, 2012 | 226 | | 19 | | 11.4 | | 0.9 | J |
| PGDW30-0412 | Apr. 17, 2012 | 384 | | 3 | | <3.8 | U | <4.7 | U |
| PGDW50-0412 | Apr. 19, 2012 | <1.3 | U | <2.7 | U | <3.8 | U | <4.7 | U |
| PGPW02-0412 | Apr. 20, 2012 | 8 | B (Blk02) | <2.7 | U | <3.8 | U | <4.7 | U |
| FieldBlk01 | Apr. 16, 2012 | <1.3 | U | <2.7 | U | <3.8 | U | <4.7 | U |
| FieldBlk02 | Apr. 18, 2012 | 12 | | <2.7 | U | 1.1 | J | <4.7 | U |
| FieldBlk03 | Apr. 22, 2012 | <1.3 | U | <2.7 | U | <3.8 | U | <4.7 | U |
| FieldBlk04 | Apr. 24, 2012 | <1.3 | U | <2.7 | U | <3.8 | U | <4.7 | U |
| EquipBlk01 | Apr. 16, 2012 | <1.3 | U | <2.7 | U | <3.8 | U | <4.7 | U |
| EquipBlk02 | Apr. 18, 2012 | 12 | | 2 | J | 0.8 | J | <4.7 | U |
| EquipBlk04 | Apr. 24, 2012 | <1.3 | U | <2.7 | U | <3.8 | U | <4.7 | U |
| TripBlk01 | Apr. 16, 2012 | <1.3 | U | <2.7 | U | <3.8 | U | <4.7 | U |
| TripBlk02 | Apr. 18, 2012 | <1.3 | U | <2.7 | U | <3.8 | U | <4.7 | U |
| TripBlk03 | Apr. 22, 2012 | <1.3 | U | <2.7 | U | <3.8 | U | <4.7 | U |
| TripBlk04 | Apr. 24, 2012 | <1.3 | U | <2.7 | U | <3.8 | U | <4.7 | U |

QC Flags:
U The analyte was analyzed for, but was not detected above the reported quantitation limit (QL)
J The analyte was positively identified. The associated numerical value is the approximate concentration of the analyte in the sample (due either to the quality of the data generated because certain quality control criteria were not met, or the concentration of the analyte was below the (QL)
B The analyte was found in a blank sample above the QL and the concentration found in the sample was less than 10 times the concentration found in the blank

The invention claimed is:

1. An apparatus to separate at least one constituent from a liquid comprising multiple constituents, comprising:
   a venturi tube comprising a venturi orifice and configured to pass the liquid through the venturi tube and further configured to introduce a carrier medium into the liquid, whereby a first portion of a first constituent in the liquid diffuses into the carrier medium;
   a mixer configured to receive the liquid and the carrier medium from the venturi tube, whereby the mixer mixes the liquid and the carrier medium;
   a plenum comprising a first exit and configured to receive the liquid and the carrier medium from the mixer, wherein the plenum is further configured to pass the liquid and the carrier medium through a free overfall stream within the plenum, whereby the carrier medium exits the liquid, and the carrier medium is discharged from the plenum through the first exit; and
   a gas analyzer configured to receive the carrier medium from the plenum through the first exit.

2. The apparatus of claim 1, wherein the first constituent continuously diffuses from the liquid into the carrier medium.

3. The apparatus of claim 2, wherein the apparatus is configured to discharge the carrier medium comprising the first constituent from the plenum through the first exit in less than about one minute from the carrier medium being introduced into the liquid.

4. The apparatus of claim 2, wherein the apparatus is configured to discharge the carrier medium comprising the first constituent from the plenum through the first exit in less than about ten seconds from the carrier medium being introduced into the liquid.

5. The apparatus of claim 4, wherein the carrier medium makes a single pass through the apparatus from the venturi orifice to the first exit of the plenum.

6. The apparatus of claim 1, wherein the first constituent comprises a hydrocarbon gas.

7. The apparatus of claim 6, wherein the liquid comprises water and the hydrocarbon gas comprises methane.

8. The apparatus of claim 7, wherein the venturi tube comprises an injection orifice configured to inject the carrier medium into the liquid.

9. The method of claim 8, wherein the carrier medium comprises a gas.

10. The apparatus of claim 1, wherein a second portion of the first constituent diffuses from the liquid into the carrier medium in the mixer.

11. The apparatus of claim 10, wherein the mixer comprises a static mixer configured to mix the carrier medium and the liquid.

12. The apparatus of claim 1, wherein a third portion of the first constituent diffuses into the carrier medium from the liquid within the plenum.

13. The apparatus of claim 12, wherein the plenum comprises a second exit to discharge the liquid from the plenum.

14. A method to separate at least one constituent from a liquid comprising multiple constituents, comprising:
   introducing the liquid into the apparatus of claim 1;
   causing a pressure drop in the liquid;
   introducing a carrier medium into the liquid;
   diffusing a first constituent of the liquid's multiple constituents into the carrier medium;
   mixing the liquid and the carrier medium; and,
   moving a portion of the carrier medium out of the liquid.

15. The method of claim 14, comprising passing the liquid through the venturi orifice.

16. The method of claim 15, comprising injecting the carrier medium into the liquid in proximity of the venturi orifice.

17. The method of claim 14, wherein the carrier medium comprises a gas in the form of bubbles, and comprising breaking the bubbles into smaller bubbles.

18. The method of claim 17, comprising breaking the bubbles into smaller bubbles using the mixer, wherein the mixer comprises a static mixer.

19. The method of claim 17, comprising moving a portion of the bubbles out of the liquid by passing the liquid and bubbles through the free overfall stream.

20. The method of claim 19, comprising collecting the bubbles as a free gas over the liquid and passing the free gas into the gas analyzer.

21. The apparatus of claim 2, wherein the apparatus is configured to discharge the carrier medium comprising the first constituent from the plenum through the first exit in less than one minute from the carrier medium being introduced into the liquid.

22. The apparatus of claim 2, wherein the apparatus is configured to discharge the carrier medium comprising the first constituent from the plenum through the first exit in less than ten seconds from the carrier medium being introduced into the liquid.

* * * * *